(12) United States Patent
He

(10) Patent No.: US 10,698,958 B2
(45) Date of Patent: Jun. 30, 2020

(54) METHOD AND SYSTEM FOR PROCESSING INFORMATION IN SOCIAL NETWORK SYSTEM

(71) Applicant: Jin He, Guangdong (CN)

(72) Inventor: Jin He, Guangdong (CN)

( * ) Notice: Subject to any disclaimer, the term of this patent is extended or adjusted under 35 U.S.C. 154(b) by 810 days.

(21) Appl. No.: 15/210,433

(22) Filed: Jul. 14, 2016

(65) Prior Publication Data

US 2016/0342691 A1 Nov. 24, 2016

Related U.S. Application Data

(63) Continuation of application No. PCT/CN2014/070860, filed on Jan. 19, 2014.

(30) Foreign Application Priority Data

Jan. 16, 2014 (WO) ................ PCT/CN2014/070749

(51) Int. Cl.
*G06F 17/30* (2006.01)
*G06F 16/951* (2019.01)
(Continued)

(52) U.S. Cl.
CPC .......... *G06F 16/951* (2019.01); *G06F 16/958* (2019.01); *G06F 40/131* (2020.01); *G06F 40/14* (2020.01); *G06F 40/166* (2020.01)

(58) Field of Classification Search
CPC .. G06F 16/951; G06F 16/958; G06F 17/2229; G06F 17/2247; G06F 17/24; G06F 40/131; G06F 40/14; G06F 40/166
See application file for complete search history.

(56) References Cited

U.S. PATENT DOCUMENTS

| 7,246,306 B2 * | 7/2007 | Chen ..................... G06F 40/103 715/205 |
| 2010/0199257 A1 * | 8/2010 | Biggerstaff ............ G06F 8/456 717/104 |

(Continued)

FOREIGN PATENT DOCUMENTS

| CN | 101176052 A | 5/2008 |
| CN | 102473189 A | 5/2012 |

(Continued)

OTHER PUBLICATIONS

Jin He, Deep information revolution: short text aggregation PK webpage, http://column.iresearch.cn/b/201308/658292.shtml, Aug. 12, 2013, CN.

(Continued)

*Primary Examiner* — Huawen A Peng

(57) ABSTRACT

A method and system for processing information in a social network system are disclosed. The method includes: in a network system, especially in a social network system, adding a piece of information having a new information structure to serve as a basic unit for expression intension of a user while enabling a user to be capable of continuously releasing a piece of information having a simple structure as a basic unit for expressing intensions. This information having the new structure describes relative locations of multiple basic units expressing meanings when being exhibited, and the meanings thereof are expressed by using a combination of the recited basic units in a manner of the multiple basic units. As such, information expression efficiency in the system is improved, and the information screening capability is enhanced, thereby naturally implementing structured reorganization of the information and significantly improving the information processing capability of the system.

14 Claims, 19 Drawing Sheets

(51) Int. Cl.
*G06F 16/958* (2019.01)
*G06F 40/14* (2020.01)
*G06F 40/131* (2020.01)
*G06F 40/166* (2020.01)

(56) References Cited

U.S. PATENT DOCUMENTS

2010/0312771 A1* 12/2010 Richardson ........... G06F 16/957
707/749
2011/0029512 A1   2/2011 Folgner et al.
2018/0114238 A1*  4/2018 Treiser ................. G06Q 50/01

FOREIGN PATENT DOCUMENTS

| | | | |
|---|---|---|---|
| CN | 102769579 | A | 11/2012 |
| CN | 103095684 | A | 5/2013 |
| CN | 103440260 | A | 12/2013 |
| EP | 2465048 | A1 | 6/2012 |
| WO | 2008041173 | A2 | 4/2008 |

OTHER PUBLICATIONS

Jin He, Microblog shopping guide will serve as an e-commerce entry in replace of Alibaba, http://chuansong.me/n/185098, Sep. 25, 2013, CN.

Jin He, AppStore 2.0, http://my.tv.sohu.com/us/190521908/60552971.shtml, Sep. 29, 2013, CN.

* cited by examiner

METHOD AND SYSTEM FOR PROCESSING INFORMATION IN SOCIAL NETWORK SYSTEM

This application is a continuation of International Application No. PCT/CN2014/070860, filed Jan. 19, 2014, which claims priority to International Application No. PCT/CN2014/070749, filed Jan. 16, 2014, both of which are hereby incorporated by reference in their entireties.

TECHNICAL FIELD

The present invention relates to the field of Internet technologies, and in particular, relates to a method, a system, a server and a client for releasing information aggregation, implementing information structuring and improving searching in a social network.

BACKGROUND

Conventional social networks, for example, Facebook, Twitter and various forums, BBS and the like, most uses one piece of information as a basic information unit for expressing users' intensions and meanings, which has an information structure significantly simpler relative to an HTML file featuring free composing and expression. In this case, when editing the information, the users almost do not need to explain how their released information is exhibited, and the social networks would process and exhibit the information released by the user according to a predetermined format. In addition, in logic, a user interface provided by the system enables the user perform an operation, such as, release, forward and comment, by using one piece of information as an integrity. As such, great convenience is brought to exchanges between users.

With development to an on-line trend of people's life and popularity of short-text information, people's daily communication and information exchanges are simultaneously recorded in a network space.

However, in the related art, information is restricted to a short text and thus the meanings or intentions of people are hard to be expressed, or people need to compose pieces of long information to express their intentions or meanings, thereby losing the advantages of short texts. In addition, a social network using the short-text information as basic information exchange units is subjected to flood of fragmented short-text information, and failure to effectively search for the short texts due to lack of a screening mechanism.

It is a constant difficulty as how to determine a basic information structure of a piece of information in the social network such that the user enjoys convenience like releasing information in an IM system, conveniently and quickly expresses complicated intentions and meanings, fully utilizes masses of fragmented information generated in on-line activities, and greatly improves the search quality and efficiency.

In addition, in the conventional search technology, each time upon search, the user almost evaluate, screen and comprehensively understand search results. However, there is still no convenient channel for releasing the achievements of the above activities to a network system, and thus the quality of the searched information source gains a slow improvement.

SUMMARY

A basic concept according to a first aspect of the present invention lies in that in a network system, especially in a social network system, a piece of information having a new information structure is added to serve as a basic unit for expression intension of a user while the user is ensured to be capable of continuously releasing a piece of information having a simple structure as a basic unit for expressing intensions. This information having the new structure describes relative locations of multiple basic units expressing meanings when being exhibited, and the meanings thereof are expressed by using a combination of the recited basic units in a manner of the multiple basic units. When editing and releasing the information having the new information structure, the users may define which basic units the information recites and define relative locations of the recited basic units when being exhibited. The recited basic units may be the information having the new information structure. As such, not only information expression efficiency in the system is improved, but also the information screening capability is enhanced, thereby naturally implementing structured reorganization of the information and significantly improving the information processing capability of the system. The term "multiple" herein refers to two or more than two. A basic inventive concept according to a second aspect of the present invention further comprises: providing a network information source by using the information having the new information structure, especially an information transfer means between a search engine and a social network; providing a more efficient and convenient technical carrier for structured reorganization and screening of the information in the social network; and implementing iterative improvements on the searched information source and thus significantly improving the search quality of the network information upon a period of time.

The basic concept according to a third aspect of the present invention lies in that (one piece of combined information described may be a basic aggregation information unit, and one piece of information may be a basic information unit, wherein the basic information unit may be a basic aggregation information unit.)

1. An information transferring method, comprising:

sending, by a client, a data request to a server to request information associated with a user account of the client;

receiving, by the client, N pieces of information sent by the server according to the data request and corresponding N pieces of identifier information; wherein the N pieces of identifier information are used for respectively uniquely identifying the N pieces of information in a system formed by the client and the server, and N is an integer greater than or equal to 2;

exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information; wherein the first indication information is used for indicating a relative location relationship of the multiple pieces of information contained in the $i^{th}$ piece of information during exhibition;

exhibiting, by the client, the piece of information when the $i^{th}$ piece of information is non-combined information; wherein i is an integer greater than 1 and smaller than or equal to N;

determining, by the client, at least two pieces of identifier information corresponding to at least two pieces of information, and at least two pieces of second indication information corresponding to the at least two pieces of information according to a predetermined operation of a user for the N pieces of information; wherein the second indication information is used for indicating a relative location relationship of the at least two pieces of information during exhibition; and sending the identifier information of the at least two pieces of information and the second indication information to the server.

2. The method according to concept 1, wherein the at least two pieces of information are at least two pieces of information in the N pieces of information, and comprise at least one piece of combined information; or;

the at least two pieces of information do not comprise combined information, and at least one of the at least two pieces of information is one of the multiple pieces of information contained in combined information.

3. The method according to concept 1 or 2, wherein the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

before or in response to judging whether the $i^{th}$ piece of information is the combined information, acquiring, by the client, the first indication information corresponding to the $i^{th}$ piece of information and exhibiting the multiple pieces of information contained in the $i^{th}$ piece of information according to the first indication information corresponding to the piece of information.

4. The method according to concept 1 or 2, wherein the $i^{th}$ piece of information received by the client is contained in a file in a predetermined format sent by the server to the client; wherein the file in the predetermined format specifies a provision of an exhibition manner of the $i^{th}$ piece of information; and the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

exhibiting the multiple pieces of information contained in the $i^{th}$ piece of information according to the provision of the exhibition manner of the multiple pieces of information contained in the $i^{th}$ piece of information specified in the file in the predetermined format; wherein the provision of the exhibition manner of the multiple pieces of information contained in the $i^{th}$ piece of information specified in the file in the predetermined format is defined by the server according to the first indication information corresponding to the $i^{th}$ piece of information.

5. The method according to concept 4, wherein the file in the predetermined format is a Hyper Text Markup Language file.

6. The method according to any one of concepts 1 to 5, wherein the predetermined operation comprises one or any combination of the following operations:

an operation for selecting at least two pieces of information in the N pieces of information; and an operation for sequencing at least two pieces of information in the N pieces of information.

7. The method according to concept 1 to 6, wherein the exhibiting multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

exhibiting, by the client, at least one piece of information in the multiple pieces of information contained in the $i^{th}$ piece of information, and hiding at least one piece of information in the multiple pieces of information contained in the $i^{th}$ piece of information; and the exhibiting, by the client, multiple pieces of information contained in an $i^{th}$ piece of information according to first indication information corresponding to the $i^{th}$ piece of information specifically comprises:

receiving an exhibition instruction from the user, and exhibiting the multiple pieces of information in the $i^{th}$ piece of information according to the exhibition instruction and the relative location relationship indicated by the first indication information; wherein the exhibition instruction is used for instructing the client to exhibit the multiple pieces of information contained in the $i^{th}$ piece of information.

8. An information transferring method, comprising:

sending, by a client, a data request to a server to request information associated with a user account of the client;

receiving, by the client, N pieces of information sent by the server according to the data request and corresponding N pieces of identifier information; wherein the N pieces of identifier information are used for respectively uniquely identifying the N pieces of information in a system formed by the client and the server, and N is an integer greater than or equal to 2;

exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information; wherein the first indication information is used for indicating a relative location relationship of the multiple pieces of information contained in the $i^{th}$ piece of information during exhibition;

exhibiting, by the client, the $i^{th}$ piece of information when the $i^{th}$ piece of information is non-combined information; wherein i is an integer greater than 1 and smaller than or equal to N;

receiving at least two pieces of information input by a user, and second indication information corresponding to the at least two pieces of information; wherein the second indication information is used for indicating a relative location relationship of the at least two pieces of information during exhibition; and sending the at least two pieces of information and the second indication information to the server.

9. The method according to concept 8, wherein the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

before or in response to judging whether the $i^{th}$ piece of information is the combined information, acquiring, by the client, the first indication information corresponding to the $i^{th}$ piece of information and exhibiting the multiple pieces of information contained in the $i^{th}$ piece of information according to the first indication information corresponding to the $i^{th}$ piece of information.

10. The method according to concept 8, wherein the $i^{th}$ piece of information received by the client is contained in a file in a predetermined format sent by the server to the client; wherein the file in the predetermined format specifies a provision of an exhibition manner of the $i^{th}$ piece of information; and the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

exhibiting the multiple pieces of information contained in the $i^{th}$ piece of information according to the provision of the exhibition manner of the multiple pieces of information contained in the $i^{th}$ piece of information specified in the file in the predetermined format; wherein the provision of the exhibition manner of the multiple pieces of information contained in the $i^{th}$ piece of information specified in the file in the predetermined format is defined by the server according to the first indication information corresponding to the $i^{th}$ piece of information.

11. The method according to concept 10, wherein the file in the predetermined format is a Hyper Text Markup Language file.

12. The method according to concepts 7 to 11, wherein the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

exhibiting, by the client, at least one piece of information in the multiple pieces of information contained in the $i^{th}$ piece of information, and hiding at least one piece of information in the multiple pieces of information contained in the $i^{th}$ piece of information; and the exhibiting, by the client, multiple pieces of information contained in an $i^{th}$ piece of information according to first indication information corresponding to the $i^{th}$ piece of information specifically comprises:

receiving an exhibition instruction from the user, and exhibiting the multiple pieces of information in the $i^{th}$ piece of information according to the exhibition instruction and the relative location relationship indicated by the first indication information; wherein the exhibition instruction is used for instructing the client to exhibit the multiple pieces of information contained in the $i^{th}$ piece of information.

13. An information transferring method, comprising:

receiving, by a server, at least two pieces of information sent by a first client, and first indication information corresponding to the at least two pieces of information; wherein the first indication information is used for indicating a relative location relationship of the at least two pieces of information during exhibition;

storing, by the server, first identifier information, wherein the first identifier information is used for uniquely identifying the at least two pieces of information in a system formed by the server and the first client, and a combination of the first indication information;

storing, by the server, identifier information of each of the at least two pieces of information; wherein the identifier of each of the at least two pieces of information is used for uniquely identifying each of the at least two pieces of information in the system formed by the server and the first client;

receiving, by the server, a data request sent by a second client, wherein the data request is used for requesting the server to send information associated with a user account of the second client to the second client; and sending, by the server, the at least two pieces of information, second identifier information and the first indication information to the second client when it is judged that a combination of the at least two pieces of information and the first indication information is the information associated with the user account of the second client; wherein the second identifier information is used for uniquely identifying the combination of: the at least two pieces of information and the first indication information, in a system formed by the server and the second client.

14. The method according to concept 13, wherein the sending, by the server, the at least two pieces of information, second identifier information and the first indication information to the second client specifically comprises:

generating, by the server, a file in a predetermined format, wherein the file in the predetermined format comprises the at least two pieces of information, the second identifier information and a provision of the relative location relationship of the at least two pieces of information during exhibition defined according to the first indication information; and sending the file in the predetermined format to the second client.

15. The method according to concept 14, wherein the file in the predetermined format is a Hyper Text Markup Language file.

16. The method according to any one of concepts 13 to 15, wherein the first indication information and the second identifier information are the same, and are applied in the server and uniquely identify the combination of: the at least two pieces of information and the first indication information, in a system formed by the first client and the second client.

17. The method according to any one of concepts 13 to 16, further comprising:

receiving, by the server, the second identifier information, third identifier information and second indication information sent by the second client; wherein the third identifier information is used for uniquely identifying third information in a system formed by the second client and the server, and the second indication information is used for indicating a location relationship of the at least two pieces of information and the third information during exhibition;

storing, by the server, the third identifier information, wherein the third identifier information is used for uniquely identifying a combination of the at least two pieces of information, the third information and the second indication information, in the system formed by the server and the second client;

receiving, by the server, a data request sent by a third client, wherein the data request is used for requesting the server to send information associated with a user account of the third client to the third client; and sending, by the server, the at least two pieces of information, the third information, the second indication information and the third identifier information to the third client when it is judged that the combination of the at least two pieces of information, the third information and the second indication information is information associated with a user account of the third client; wherein the third identifier is used for uniquely identifying the combination of: at least two pieces of information, the third information and the second indication information in a system formed by the server and the third client.

18. An information transferring method, comprising:

receiving, by a server, identifier information of each of at least two pieces of information sent by a first client, and first indication information corresponding to the at least two pieces of information; wherein the first indication information is used for indicating a relative location relationship of the at least two pieces of information during exhibition, and the identifier of each of the at least two pieces of information is used for uniquely identifying each of the at least two pieces of information in the system formed by the server and the first client;

storing, by the server, first identifier information, wherein the first identifier information is used for uniquely identifying the at least two pieces of information in a system formed by the server and the first client, and a combination of the first indication information;

receiving, by the server, a data request sent by a second client, wherein the data request is used for requesting the server to send information associated with a user account of the second client to the second client; and sending, by the server, the at least two pieces of information, second identifier information and the first indication information to the second client when it is judged that a combination of the at least two pieces of information and the first indication information is the information associated with the user account of the second client; wherein the second identifier information is used for uniquely identifying the combination of: the at least two pieces of information and the first indication information, in a system formed by the server and the second client.

19. The method according to concept 18, wherein the sending, by the server, the at least two pieces of information, identifier information of the combined information and the first indication information to the second client specifically comprises:

generating, by the server, a file in a predetermined format, wherein the file in the predetermined format comprises the at least two pieces of information and a provision of the relative location relationship of the at least two pieces of information during exhibition defined according to the first indication information; and sending the file in the predetermined format to the second client.

20. The method according to concept 19, wherein the file in the predetermined format is a Hyper Text Markup Language file.

21. The method according to any one of concepts 18 to 20, further comprising:

receiving, by the server, the second identifier information, third identifier information and second indication information sent by the second client; wherein the third identifier information is used for uniquely identifying third information in a system formed by the second client and the server, and the second indication information is used for indicating a location relationship of the at least two pieces of information and the third information during exhibition;

storing, by the server, the third identifier information, wherein the third identifier information is used for uniquely identifying a combination of: the at least two pieces of information, the third information and the second indication information, in the system formed by the server and the second client;

receiving, by the server, a data request sent by a third client, wherein the data request is used for requesting the server to send information associated with a user account of the third client to the third client; and sending, by the server, the at least two pieces of information, the third information, the second indication information and the third identifier information to the third client when it is judged that the combination of the at least two pieces of information, the third information and the second indication information is information associated with a user account of the third client; wherein the third identifier is used for uniquely identifying the combination of: at least two pieces of information, the third information and the second indication information, in a system formed by the server and the third client.

22. The method according to any one of concepts 18 to 21, wherein the first indication information and the second identifier information are the same, and are applied in the server and uniquely identify the combination of: the at least two pieces of information and the first indication information, in a system formed by the first client and the second client.

23. A client, comprising:

a sender, configured to send a data request to a server to request information associated with a user account of the client;

a receiver, configured to receive N pieces of information sent by the server according to the data request and corresponding N pieces of identifier information; wherein the N pieces of identifier information are used for respectively uniquely identify the N pieces of information in a system formed by the client and the server, and N is an integer greater than or equal to 2;

an output device, configured to exhibit multiple pieces of information contained in an $i^{th}$ piece of information according to first indication information corresponding to the $i^{th}$ piece of information when the $i^{th}$ piece of information in the N pieces of information is combined information containing the multiple pieces of information; wherein the first indication information is used for indicating a relative location relationship of the multiple pieces of information contained in the $i^{th}$ piece of information during exhibition;

wherein the output device is further configured to exhibit the piece of information when the $i^{th}$ piece of information is non-combined information;

wherein i is an integer greater than 1 and less than N;

wherein the client further comprises:

an input device, configured to receive an operation of a user for the N pieces of information;

a processor, configured to determine at least two pieces of identifier information corresponding to at least two pieces of information, and at least two pieces of second indication information corresponding to the at least two pieces of information according to a predetermined operation when the operation of the user for the N pieces of information is the predetermined operation; wherein the second indication information is used for indicating a relative location relationship of the at least two pieces of information during exhibition;

wherein the sender is further configured to send the identifier information of the at least two pieces of information and the second indication information to the server.

24. The method according to concept 23, wherein the at least two pieces of information are at least two pieces of information in the N pieces of information, and comprise at least one piece of combined information; or the at least two pieces of information do not comprise combined information, and at least one of the at least two pieces of information is one of the multiple pieces of information contained in combined information.

25. The client according to concept 23 or 24, wherein the receiver is further configured to receive the first indication information from the server; and the output device is specifically configured to exhibit the multiple pieces of information contained in the $i^{th}$ piece of information according to the first indication information.

26. The client according to concept 23 or 24, wherein the $i^{th}$ piece of information received by the client is contained in a file in a predetermined format sent by the server to the client; wherein the file in the predetermined format specifies a provision of an exhibition manner of the $i^{th}$ piece of information; and the output device is specifically configured to exhibit the multiple pieces of information contained in the $i^{th}$ piece of information according to the provision of the exhibition manner of the multiple pieces of information contained in the $i^{th}$ piece of information specified in the file in the predetermined format when the $i^{th}$ piece of information is combined information containing multiple pieces of information; wherein the provision of the exhibition manner of the multiple pieces of information contained in the $i^{th}$ piece of information specified in the file in the predetermined format is defined by the server according to the first indication information corresponding to the $i^{th}$ piece of information.

27. The client according to concept 26, wherein the file in the predetermined format is a Hyper Text Markup Language file.

28. The client according to any one of concepts 23 to 27, wherein the predetermined operation comprises one or any combination of the following operations:

an operation for selecting at least two pieces of information in the N pieces of information; and an operation for sequencing at least two pieces of information in the N pieces of information.

29. The client according to any one of concepts 23 to 28, wherein the input device is further configured to receive an exhibition instruction input by the user; wherein the exhibition instruction is used for instructing the client to exhibit the multiple pieces of information contained in the $i^{th}$ piece of information; and the output device is specifically configured to: exhibit at least one piece of information in the multiple pieces of information contained in the $i^{th}$ piece of information, and hiding at least one piece of information in the multiple pieces of information contained in the ill' piece of information when the $i^{th}$ piece of information in the N pieces of information is combined information containing the multiple pieces of information; exhibit the multiple pieces of information in the $i^{th}$ piece of information according to the exhibition instruction and the relative location relationship indicated by the first indication information when the exhibition instruction is received; and exhibit the $i^{th}$ piece of information when the $i^{th}$ piece of information is non-combined information.

30. A client, comprising:

a sender, configured to send a data request to a server to request information associated with a user account of the client;

a receiver, configured to receive N pieces of information sent by the server according to the data request and corresponding N pieces of identifier information; wherein the N pieces of identifier information are used for respectively uniquely identify the N pieces of information in a system formed by the client and the server, and N is an integer greater than or equal to 2;

an output device, configured to exhibit multiple pieces of information contained in an $i^{th}$ piece of information according to first indication information corresponding to the $i^{th}$ piece of information when the $i^{th}$ piece of information in the N pieces of information is combined information containing the multiple pieces of information; wherein the first indication information is used for indicating a relative location relationship of the multiple pieces of information contained in the $i^{th}$ piece of information during exhibition;

wherein the output device is further configured to exhibit the $i^{th}$ piece of information when the $i^{th}$ piece of information is non-combined information;

wherein i is an integer greater than 1 and less than N;

wherein the client further comprises:

an input device, configured to receive at least two pieces of information input by a user, and second indication information corresponding to the at least two pieces of information; wherein the second indication information is used for indicating a relative location relationship of the at least two pieces of information during exhibition; and a processor, configured to determine at least two pieces of identifier information corresponding to at least two pieces of information, and at least two pieces of second indication information corresponding to the at least two pieces of information according to a predetermined operation when the operation of the user for the N pieces of information is the predetermined operation; wherein the second indication information is used for indicating a relative location relationship of the at least two pieces of information during exhibition;

wherein the sender is further configured to send the at least two pieces of information and the second indication information to the server.

31. The client according to concept 30, wherein the receiver is further configured to receive the first indication information from the server; and the output device is specifically configured to exhibit the multiple pieces of information contained in the $i^{th}$ piece of information.

32. The client according to concept 30, wherein the $i^{th}$ piece of information received by the client is contained in a file in a predetermined format sent by the server to the client; wherein the file in the predetermined format specifies a provision of an exhibition manner of the $i^{th}$ piece of information; and the output device is specifically configured to exhibit the multiple pieces of information contained in the $i^{th}$ piece of information according to the provision of the exhibition manner of the multiple pieces of information contained in the $i^{th}$ piece of information specified in the file in the predetermined format when the $i^{th}$ piece of information is combined information containing multiple pieces of information; wherein the provision of the exhibition manner of the multiple pieces of information contained in the $i^{th}$ piece of information specified in the file in the predetermined format is defined by the server according to the first indication information corresponding to the $i^{th}$ piece of information.

33. The client according to concept 32, wherein the file in the predetermined format is a Hyper Text Markup Language file.

34. The client according to any one of concepts 30 to 33, wherein the input device is further configured to receive an exhibition instruction input by the user; wherein the exhibition instruction is used for instructing the client to exhibit the multiple pieces of information contained in the $i^{th}$ piece of information; and the output device is specifically configured to: exhibit at least one piece of information in the multiple pieces of information contained in the $i^{th}$ piece of information, and hiding at least one piece of information in the multiple pieces of information contained in the $i^{th}$ piece of information when the piece of information in the N pieces of information is combined information containing the multiple pieces of information; exhibit the multiple pieces of information in the $i^{th}$ piece of information according to the exhibition instruction and the relative location relationship indicated by the first indication information when the exhibition instruction is received; and exhibit the $i^{th}$ piece of information when the $i^{th}$ piece of information is non-combined information.

35. A server, comprising:

a receiver, configured to receive at least two pieces of information sent by a first client, and first indication information corresponding to the at least two pieces of information; wherein the first indication information is used for indicating a relative location relationship of the at least two pieces of information during exhibition; and a memory, configured to store first identifier information, and identifier information of each of the at least two pieces of information; wherein the first identifier information is used for uniquely identifying a combination of: the at least two pieces of information and the first indication information, in a system formed by the server and the first client, and the identifier of each of the at least two pieces of information is used for uniquely identifying each of the at least two pieces of information in the system formed by the server and the first client;

wherein the receiver is further configured to receive a data request sent by a second client, wherein the data request is used for requesting the server to send information associated with a user account of the second client to the second client;

wherein the server further comprises:

a processor, configured to judge whether a combination of the at least two pieces of information and the first indication information is information associated with the user account of the second client; and a sender, configured to send the at least two pieces of information, second identifier information and the first indication information to the second client when the server judges that a combination of the at least two pieces of information and the first indication information is the information associated with the user account of the second client; wherein the second identifier information is used for uniquely identifying the combination of: the at least two pieces of information and the first indication information, in a system formed by the server and the second client.

36. The server according to concept 35, wherein the processor is further configured to generate a file in a predetermined format when it is judged that the combination of the at least two pieces of information and the first indication information is the information associated with the user account of the second client, wherein the file in the predetermined format comprises the at least two pieces of information, the second identifier information and a provision of the relative location relationship of the at least two pieces of information during exhibition defined according to the first indication information; and the sender is specifically configured to send the file in the predetermined format to the second client.

37. The server according to concept 36, wherein the file in the predetermined format is a Hyper Text Markup Language file.

38. The server according to any one of concepts 35 to 37, wherein the first indication information and the second identifier information are the same, and are applied in the server and uniquely identify the combination of: the at least two pieces of information and the first indication information, in a system formed by the first client and the second client.

39. The server according to any one of concepts 35 to 38, wherein the receiver is further configured to receive the second identifier information, third identifier information and second indication information sent by the second client; wherein the third identifier information is used for uniquely identifying third information in a system formed by the second client and the server, and the second indication information is used for indicating a location relationship of the at least two pieces of information and the third information during exhibition;

the memory is further configured to store the third identifier information, wherein the third identifier information is used for uniquely identifying a combination of: the at least two pieces of information, the third information and the second indication information, in the system formed by the server and the second client;

the receiver is further configured to receive a data request sent by a third client, wherein the data request is used for requesting the server to send information associated with a user account of the third client to the third client;

the processor is further configured to judge whether a combination of the at least two pieces of information, the third information and the second indication information is information associated with a user account of the third client; and the sender is further configured to send the at least two pieces of information, the third information, the second indication information and the third identifier information to the third client when the server judges that the combination of the at least two pieces of information, the third information and the second indication information is information associated with a user account of the third client; wherein the third identifier is used for uniquely identifying the combination of: at least two pieces of information, the third information and the second indication information, in a system formed by the server and the third client.

40. A server, comprising:

a receiver, configured to receive identifier information of each of at least two pieces of information sent by a first client, and first indication information corresponding to the at least two pieces of information; wherein the first indication information is used for indicating a relative location relationship of the at least two pieces of information during exhibition, and the identifier of each of the at least two pieces of information is used for uniquely identifying each of the at least two pieces of information in a system formed by the server and the first client; and a memory, configured to store first identifier information, wherein the first identifier information is used for uniquely identifying a combination of: the at least two pieces of information and the first indication information, in a system formed by the server and the first client;

wherein the receiver is further configured to receive a data request sent by a second client, wherein the data request is used for requesting the server to send information associated with a user account of the second client to the second client;

wherein the server further comprises:

a processor, configured to judge whether a combination of the at least two pieces of information and the first indication information is information associated with the user account of the second client; and a sender, configured to send the at least two pieces of information, second identifier information and the first indication information to the second client when the server judges that a combination of the at least two pieces of information and the first indication information is the information associated with the user account of the second client; wherein the second identifier information is used for uniquely identifying the combination of: the at least two pieces of information and the first indication information, in a system formed by the server and the second client.

41. The server according to concept 40, wherein the processor is further configured to generate a file in a predetermined format when it is judged that the combination of the at least two pieces of information and the first indication information is the information associated with the user account of the second client, wherein the file in the predetermined format comprises the at least two pieces of information, the second identifier information and a provision of the relative location relationship of the at least two pieces of information during exhibition defined according to the first indication information; and the sender is specifically configured to send the file in the predetermined format to the second client.

42. The server according to concept 41, wherein the file in the predetermined format is a Hyper Text Markup Language file.

43. The server according to any one of concepts 40 to 42, wherein the receiver is further configured to receive the second identifier information, third identifier information and second indication information sent by the second client; wherein the third identifier information is used for uniquely identifying third information in a system formed by the second client and the server, and the second indication information is used for indicating a location relationship of the at least two pieces of information and the third information during exhibition;

the memory is further configured to store the third identifier information, wherein the third identifier information is used for uniquely identifying a combination of: the at least two pieces of information, the third information and the second indication information, in the system formed by the server and the second client;

the receiver is further configured to receive a data request sent by a third client, wherein the data request is used for requesting the server to send information associated with a user account of the third client to the third client;

the processor is further configured to judge whether a combination of the at least two pieces of information, the third information and the second indication information is information associated with a user account of the third client; and the sender is further configured to send the at least two pieces of information, the third information, the second indication information and the third identifier information to the third client when it is judged that the combination of the at least two pieces of information, the third information and the second indication information is information associated with a user account of the third client; wherein the third identifier is used for uniquely identifying the combination of: at least two pieces of information, the third information and the second indication information, in a system formed by the server and the third client.

44. The server according to any one of concepts 40 to 43, wherein the first indication information and the second identifier information are the same, and are applied in the server and uniquely identify the combination of: the at least two pieces of information and the first indication information, in a system formed by the first client and the second client.

45. An information transferring method, comprising:

sending, by a first server, data to a client according to a request from a user for requesting the client to exhibit the data to the user;

receiving, by the first server, multiple pieces of information sent by the client according to the exhibited data, and indication information associated with the multiple pieces of information; wherein the indication information is used for indicating a relative location relationship of the multiple pieces of information during exhibition;

acquiring, by the first server, authorization information of the client; wherein the authorization information is used for authorizing the first server to send data to a second server by using a user account of the client; and sending, by the first server, the multiple pieces of information and the indication information to the second server by using the user account according to the authorization information.

46. The method according to concept 45, wherein the sending, by a first server, data to a client according to a request from a user specifically comprises:

encapsulating, by the first server, the data in a file in a predetermined format and sending the file to the client; wherein the file in the predetermined format further comprises option information;

wherein the option information is exhibited as an option interface element, and when the option interface element is selected by the user, an operation option is provided for the user, such that the user uses information relevant to the data as one of the multiple pieces of information according to the option, and designates the location of the information relevant to the data in the multiple pieces of information during exhibition; and the receiving, by the first server, multiple pieces of information sent by the client according to the exhibited data, and indication information associated with the multiple pieces of information specifically comprises:

receiving, by the first server, the multiple pieces of information sent by the user of the client according to the operation option, and the indication information.

47. The method according to concept 46, wherein when the file in the predetermined format is exhibited on the client, the data is partitioned into a plurality of items; wherein a part or all of the plurality of items each correspond to one piece of the option information in the file in the predetermined format; and the receiving, by the first server, the multiple pieces of information sent by the user of the client according to the operation option, and the indication information specifically comprises:

receiving, by the first server, first to $n^{th}$ pieces of information relevant to first to $n^{th}$ items in the data which are respectively sent by the user of the client according to first to $n^{th}$ operation options, and indication information indicative of locations of the first to $n^{th}$ pieces of information in the multiple pieces of information during exhibition which is respectively sent by the user of the client according to the first to $n^{th}$ operation options;

wherein the first to $n^{th}$ pieces of information constitute the multiple pieces of information, and n is an integer greater than or equal to 2.

48. The method according to concept 47, wherein the information relevant to the data is one of the multiple pieces of information, or is information acquired upon addition, deletion or modification made to the multiple pieces of items; and the first to $n^{th}$ pieces of information are respectively the first to $n^{th}$ items, or are respectively information acquired upon addition, deletion or modification made to the first to $n^{th}$ items.

49. The method according to any one of concepts 45 to 48, wherein the file in the predetermined format is a Hyper Text Markup Language file.

50. A server, comprising:

a sender, configured to send data to a client according to a request from a user for requesting the client to exhibit the data to the user; and a receiver, configured to: receive multiple pieces of information sent by the client according to the exhibited data, and indication information associated with the multiple pieces of information, wherein the indication information is used for indicating a relative location relationship of the multiple pieces of information during exhibition; and receive authorization information of the client, wherein the authorization information is used for authorizing the first server to send data to a second server by using a user account of the client;

wherein the sender is further configured to send the multiple pieces of information and the indication information to the second server by using the user account according to the authorization information.

51. The server according to concept 50, wherein the server further comprises a processor, configured to encapsulate the data in a file in a predetermined format;

the sending data to a client according to a request from a user by the server specifically comprises: sending the file in the predetermined format by the sender to the client;

wherein the file in the predetermined format further comprises option information; wherein the option information is exhibited as an option interface element, and when the option interface element is selected by the user, an operation option is provided for the user, such that the user uses information relevant to the data as one of the multiple pieces of information according to the option, and designates the location of the information relevant to the data in the multiple pieces of information during exhibition; and the receiver is specifically configured to receive the multiple pieces of information sent by the user of the client according to the operation option, and the indication information.

52. The server according to concept 51, wherein when the file in the predetermined format is exhibited on the client, the data is partitioned into a plurality of items; wherein a part or all of the plurality of items each correspond to one piece of the option information in the file in the predetermined format; and the receiver is specifically configured to receive first to $n^{th}$ pieces of information relevant to first to $n^{th}$ items in the data which are respectively sent by the user of the client according to first to $n^{th}$ operation options, and indication information indicative of locations of the first to $n^{th}$ pieces of information in the multiple pieces of information during exhibition which is respectively sent by the user of the client according to the first to $n^{th}$ operation options;

wherein the first to $n^{th}$ pieces of information constitute the multiple pieces of information, and n is an integer greater than or equal to 2.

53. The server according to concept 52, wherein the information relevant to the data is one of the multiple pieces of information, or is information acquired upon addition, deletion or modification made to the multiple pieces of items; and the first to $n^{th}$ pieces of information are respectively the first to $n^{th}$ items, or are respectively information acquired upon addition, deletion or modification made to the first to $n^{th}$ items.

54. The server according to any one of concepts 50 to 53, wherein the file in the predetermined format is a Hyper Text Markup Language file.

A basic inventive concept according to a fourth aspect of the present invention lies in that: (hereinafter the sequence numbers are irrelevant to those described above; in addition, the sequence numbers of the modules or submodules given hereinafter are merely valid in the correspondingly described system, server and client respectively; for example, a module having a sequence number in the description of a client and a module having the same sequence number in the description of a system are not necessarily required to be the same).

1. A system for providing a social network service, comprising the following modules:

an aggregation instruction receiving module 1-(1), comprising the following submodules:

a predetermined operation interface exhibiting module 1-(1)-A, configured to provide a predetermined operation option of a basic information unit for a user on an interface where the basic information unit is exhibited;

a predetermined operation instruction receiving module 1-(1)-B, configured to: (i) receive an instruction from the user and acquire which basic information unit is an aggregated basic information unit selected by the user, wherein the selected basic information unit may be a basic aggregation information unit; (ii) receive an instruction from the user and acquire a setting made by the user for a location attribute of the selected basic information unit in an edited basic aggregation information unit, wherein the location attribute is used for describing a relative location information of the basic information unit and the other basic information units aggregated in the above basic aggregation information unit when the above basic aggregation information unit is exhibited; and an aggregation instruction information transferring module 1-(1)-C, configured to transfer the instruction received by the predetermined operation instruction receiving module 1-(1)-B to a basic aggregation information unit editing module 1-(2);

a basic aggregation information unit editing module 1-(2), comprising the following submodules:

a basic aggregation information unit composing module 1-(2)-A, configured to write a basic aggregation information unit according to the instruction sent by the aggregation instruction receiving module;

an integrity setting module 1-(2)-B, configured to set an integrity attribute for a data recorder of the basic aggregation information unit composed by the basic aggregation information unit composing module 1-(2)-A, such that the basic aggregation information unit becomes a basic information unit which is integrally operable in logic, comprising being integrally selected as a piece of information, and being aggregated integrally as a piece of information; the term "logic" herein is defined relative to a physical entity; information may be recorded, transferred and processed in a system physical entity in a plurality of manners; however, one piece of information serving as a basic information unit in the system should be integrally set such that the basic information unit becomes an integrally operable object in terms of logic, for example, the basic information unit is sent and stored according to an agreed protocol to indicate that the basic information unit is a piece of information, such that from the perspective of logic, selection of a piece information is equivalent to selection of an integrity of the information; still for example, sending a piece of information is equivalent to sending an integrity of the information; although a constitution element of the information is still stored in another location, data of the constitution element is not directly present in the sent actual information flow; and a generated basic aggregation information unit transferring module 1-(2)-C, configured to send the basic aggregation information unit with integrity setting implemented by the integrity setting module 1-(2)-B to a corresponding receiving module, and send the basic aggregation information unit to a basic aggregation information storage module 1-(3);

a basic aggregation information unit storage module 1-(3), comprising the following submodules:

a generated basic aggregation information unit receiving module 1-(3)-A, configured to receive the basic aggregation information unit sent by the generated basic aggregation information unit transferring module 1-(2)-C;

a database module 1-(3)-B, configured to store the basic aggregation information unit and the aggregated basic information unit; wherein with respect to each aggregated basic information unit, a data record stored therein comprises a value of a first identifier and information content of the basic information unit; the value of the first identifier is used for searching in the storage module for the stored data record of the basic information unit; with respect to each basic aggregation information unit, a data record stored therein comprises a value of a second identifier and the value of the first identifier of each aggregated basic information unit in the basic aggregation information unit, and first indication information indicating a relative location relationship of the aggregation basic information units during exhibition when the basic aggregation information unit is exhibited; and the first identifier and the second identifier may be the same identifier or may be the different identifiers; and a stored basic aggregation information unit sending module 1-(3)-C, configured to send the basic aggregation information unit to a basic aggregation information unit parsing module 1-(4);

a basic aggregation information unit parsing module 1-(4), configured to: receive the basic aggregation information unit sent by the basic aggregation information unit storage module 1-(3) or the basic aggregation information unit editing module 1-(2); parse the basic aggregation information unit to an information format desired by a parsed basic aggregation information unit exhibiting module 1-(5); and transfer the information in the information format to the basic aggregation information exhibiting module 1-(5); and a parsed basic aggregation information unit exhibiting module 1-(5), comprising the following submodules:

a parsed basic aggregation information receiving module 1-(5)-A, configured to receive the information sent by the basic aggregation information unit parsing module 1-(4);

a foldedly exhibiting module 1-(5)-B, configured to foldedly exhibit the basic aggregation information unit; wherein when the basic aggregation information unit is foldedly exhibited, at least one of the aggregated basic information units therein is hidden; and an unfoldedly exhibiting module 1-(5)-C, configured to unfoldedly exhibit the basic aggregation information unit; wherein when the basic aggregation information unit is unfoldedly exhibited, in at least one unfolding state, the aggregated basic information unit is exhibited according to a relative location relationship required by the location attribute thereof recorded in the basic aggregation information unit.

2. The system according to concept 1, wherein (1) the basic aggregation information unit storage module 1-(3) further comprises the following submodules:

a basic information unit modification information receiving module 1-(3)-D, configured to receive modification information of a released basic information unit; wherein the basic information unit comprises a released basic aggregation information unit and a released aggregated basic information unit, release of the aggregated basic information unit comprising release of the aggregation basic information unit as an individual basic information unit and comprising release of the aggregation basic information unit with release of other basic aggregation information unit; and a basic information unit modification processing module 1-(3)-E, configured to, when the released basic information unit is at least modified, send a corresponding operation instruction to the database module 1-(3)-B, such that a record of the information content before modification of the basic information unit is still stored; and (2) the parsed basic aggregation information unit exhibiting module 1-(5) further comprises the following submodules:

a basic information unit traceability exhibiting module 1-(5)-D, configured to: if the information content of the basic information units exhibited by the parsed basic aggregation information unit exhibiting module is different from original information content at a later time point of the two time points when the basic information units are released or aggregated, exhibit an traceability option to a user, and exhibits the original information content of the basic information units at the time point upon receiving a traceability instruction from the user; wherein the basic information units comprise the basic aggregation information unit and the aggregated basic information units that are aggregated.

3. The system according to concept 2, wherein the basic information unit is allowed to use the following information structure: content proactively input by the user only comprises texts, or only comprises texts and symbols.

4. The system according to concept 3, wherein the location attribute of the aggregated basic information unit is described in the following manners: A. the basic aggregation information unit comprises at least one aggregated basic information unit set, the set having location attribute during display in at least one exhibition interface when the basic aggregation information unit is foldedly exhibited, the set comprising at least two aggregated basic information units; B. each aggregated basic information unit in the set has a sequential location when the aggregated basic information unit is displayed, wherein relative locations when the aggregated basic information units in the set are exhibited in an unfoldedly exhibition state would be in accordance with the sequential location.

5. The system according to concept 4, wherein (1) the predetermined operation of 1-(1) the aggregation instruction receiving module further comprises at least one of the following operations: A. duplicating one aggregated basic information unit set, and generating a new aggregated basic information unit set; B. selecting an aggregated basic information unit in the new set; C. adding a new aggregated basic information unit into the new set; D. adjusting sequential locations of the aggregated basic information units in the new set; E. deleting an aggregated basic information unit in the new set; F. performing an aggregation operation for the aggregated basic information unit set, comprising adding one set into another set; and (2) the basic aggregation information unit editing module 1-(2) further comprises the following submodule: an aggregation-related editing module 1-(2)-D, configured to perform the above predetermined operation according to an instruction sent by the aggregation instruction receiving module.

6. The system according to concept 5, wherein the information provided by the basic aggregation information unit parsing module 1-(4) for the parsed basic aggregation information unit exhibiting module is in a format of a file composed by using the HTML language.

7. The system according to concept 6, wherein the basic information unit is restricted to short-text information.

8. The system according to concept 1, further comprising:

(1) an information providing module, configured to provide an operation interface for acquiring system internal information and/or system external information for the user to acquire corresponding information, and provide an exhibition interface to exhibit information to the user; and (2) the exhibition interface suitable for the predetermined operation of the aggregation instruction receiving module comprises (1) at least one exhibition interface exhibiting the basic information unit in the information exhibition interface.

9. The system according to concept 8, wherein the aggregation instruction receiving module 1-(1) further comprises the following submodule:

a non-basic information unit predetermined interface exhibiting module 1-(1)-D, configured to provide a predetermined operation option with respect to the information for the user on an interface exhibiting information of the non-basic information unit, comprising at least one or any combination of the following predetermined operations: (i) editing a basic information unit for the user according to the information and using the basic information unit as an aggregated basic information unit; (ii) editing a basic information unit draft for the user according to the user and providing an editing interface for the user such that the user uses the edited basic information unit as the aggregated basic information unit.

10. A server for use in a social network, comprising the following modules:

a basic aggregation information unit storage module 1-(3), comprising the following submodules:

a generated basic aggregation information unit receiving module 1-(3)-A, configured to receive the basic aggregation information unit sent by a generated basic aggregation information unit transferring module 1-(2)-C;

a database module, configured to store the basic aggregation information unit and the aggregated basic information unit 1-(3)-B; wherein with respect to each aggregated basic information unit, a data record stored therein comprises a value of a first identifier and information content of the basic information unit; the value of the first identifier is used for searching in the storage module for the stored data record of the basic information unit; with respect to each basic aggregation information unit, a data record stored therein comprises a value of a second identifier and the value of the first identifier of each aggregated basic information unit in the basic aggregation information unit, and first indication information indicating a relative location relationship of the aggregation basic information units during exhibition when the basic aggregation information unit is exhibited; and the first identifier and the second identifier may be the same identifier or may be the different identifiers; and a stored basic aggregation information unit sending module 1-(3)-C, configured to send the basic aggregation information unit to a basic aggregation information unit parsing module 1-(4).

11. The server according to concept 10, comprising: a basic aggregation information unit parsing module 1-(4), configured to: receive the basic aggregation information unit sent by the basic aggregation information unit storage module 1-(3) or the basic aggregation information unit editing module 1-(2); parse the basic aggregation information unit to an information format desired by a parsed basic aggregation information unit exhibiting module 1-(5); and transfer the information in the information format to the basic aggregation information unit exhibiting module 1-(5).

12. The server according to concept 11, wherein the information provided by the basic aggregation information unit parsing module 1-(4) for the parsed basic aggregation information unit exhibiting module 1-(5) is in a format of a file composed by using the HTML language.

13. The server according to concept 10, 11 or 12, wherein the basic aggregation information unit storage module 1-(3) further comprises the following submodules:

a basic information unit modification information receiving module 1-(3)-D, configured to receive modification information of a released basic information unit; wherein the basic information unit comprises a released basic aggregation information unit and a released aggregated basic information unit, release of the aggregated basic information unit comprising release of the aggregation basic information unit as an individual basic information unit and comprising release of the aggregation basic information unit with release of other basic aggregation information unit; and a basic information unit modification processing module 1-(3)-E, configured to, when the released basic information unit is at least modified, send a corresponding operation instruction to the database module 1-(3)-B, such that a record of the information content before modification of the basic information unit is still stored.

14. The server according to any one of concepts 11 to 13, further comprising:

a basic aggregation information unit editing module 1-(2), comprising the following submodules:

a basic aggregation information unit composing module 1-(2)-A, configured to compose a basic aggregation information unit according to the instruction sent by the aggregation instruction receiving module;

an integrity setting module 1-(2)-B, configured to set an integrity attribute for a data recorder of the basic aggregation information unit composed by the basic aggregation information unit composing module 1-(2)-A, such that the basic aggregation information unit becomes a basic information unit which is integrally operable in logic, comprising being integrally selected as a piece of information, and being aggregated integrally as a piece of information; and a generated basic aggregation information unit transferring module 1-(2)-C, configured to send the basic aggregation information unit with integrity setting implemented by the integrity setting module 1-(2)-B to a corresponding receiving module, and send the basic aggregation information unit to a basic aggregation information storage module 1-(3).

15. The server according to concept 10, wherein the basic information unit is allowed to use the following information structure: content proactively input by the user only comprises texts, or only comprises texts and symbols.

16. The server according to any one of concepts 10 to 15, wherein the basic information unit is restricted to short-text information.

17. A client for use in a social network, comprising:

an aggregation instruction receiving module 1-(1), comprising the following submodules:

a predetermined operation interface exhibiting module 1-(1)-A, configured to provide a predetermined operation option of a basic information unit for a user on an interface where the basic information unit is exhibited;

a predetermined operation instruction receiving module 1-(1)-B, configured to: (i) receive an instruction from the user and acquire which basic information unit is an aggregated basic information unit selected by the user, wherein the selected basic information unit may be a basic aggregation information unit; (ii) receive an instruction from the user and acquire a setting made by the user for a location attribute of the selected basic information unit in an edited basic aggregation information unit, wherein the location attribute is used for describing a relative location information of the basic information unit and the other basic information units aggregated in the above basic aggregation information unit when the above basic aggregation information unit is exhibited; and an aggregation instruction information transferring module 1-(1)-C, configured to transfer the instruction received by the predetermined operation instruction receiving module 1-(1)-B to a basic aggregation information unit editing module 1-(2).

18. The client according to concept 17, further comprising:

a parsed basic aggregation information unit exhibiting module 1-(5), comprising the following submodules:

a parsed basic aggregation information receiving module 1-(5)-A, configured to receive the information sent by the basic aggregation information unit parsing module 1-(4);

a foldedly exhibiting module 1-(5)-B, configured to foldedly exhibit the basic aggregation information unit; wherein when the basic aggregation information unit is foldedly exhibited, at least one of the aggregated basic information units therein is hidden; and an unfoldedly exhibiting module 1-(5)-C, configured to unfoldedly exhibit the basic aggregation information unit; wherein when the basic aggregation information unit is unfoldedly exhibited, in at least one unfolding state, the aggregated basic information unit is exhibited according to a relative location relationship required by the location attribute thereof recorded in the basic aggregation information unit.

19. The client according to concept 17, further comprising:

(1) an information providing module, configured to provide an operation interface for acquiring system internal information and/or system external information for the user to acquire corresponding information, and provide an exhibition interface to exhibit information to the user; and (2) the exhibition interface suitable for the predetermined operation of the aggregation instruction receiving module comprises (1) at least one exhibition interface exhibiting the basic information unit in the information exhibition interface.

20. The client according to concept 19, wherein the aggregation instruction receiving module 1-(1) further comprises the following submodule:

a non-basic information unit predetermined interface exhibiting module 1-(1)-D, configured to provide a predetermined operation option with respect to the information for the user on an interface exhibiting information of the non-basic information unit, comprising at least one or any combination of the following predetermined operations: (i) editing a basic information unit for the user according to the information and using the basic information unit as an aggregated basic information unit; (ii) editing a basic information unit draft for the user according to the user and providing an editing interface for the user such that the user uses the edited basic information unit as the aggregated basic information unit.

21. The client according to any one of concepts 17 to 20, wherein (1) the location attribute of the aggregated basic information unit is described in the following manners: A. the basic aggregation information unit comprises at least one aggregated basic information unit set, the set having location attribute during display in at least one exhibition interface when the basic aggregation information unit is foldedly exhibited, the set comprising at least two aggregated basic information units; B. each aggregated basic information unit in the set has a sequential location when the aggregated basic information unit is displayed, wherein relative locations when the aggregated basic information units in the set are exhibited in an unfoldedly exhibition state would be in accordance with the sequential location;

(2) the predetermined operation of 1-(1) the aggregation instruction receiving module further comprises at least one of the following operations: A. duplicating one aggregated basic information unit set, and generating a new aggregated basic information unit set; B. selecting an aggregated basic information unit in the new set; C. adding a new aggregated basic information unit into the new set; D. adjusting sequential locations of the aggregated basic information units in the new set; E. deleting an aggregated basic information unit in the new set; F. performing an aggregation operation for the aggregated basic information unit set, comprising adding one set into another set; and (3) the basic aggregation information unit editing module 1-(2) further comprises the following submodule: an aggregation-related editing module 1-(2)-D, configured to perform the above predetermined operation according to an instruction sent by the aggregation instruction receiving module.

22. The client according to concept 17, −21 or 12, wherein the basic aggregation information unit editing module 1-(2) further comprises the following submodules:

a basic aggregation information unit composing module 1-(2)-A, configured to compose a basic aggregation information unit according to the instruction sent by the aggregation instruction receiving module;

an integrity setting module 1-(2)-B, configured to set an integrity attribute for a data recorder of the basic aggregation information unit composed by the basic aggregation information unit composing module 1-(2)-A, such that the basic aggregation information unit becomes a basic information unit which is integrally operable in logic, comprising being integrally selected as a piece of information, and being aggregated integrally as a piece of information; and a generated basic aggregation information unit transferring module 1-(2)-C, configured to send the basic aggregation information unit with integrity setting implemented by the integrity setting module 1-(2)-B to a corresponding receiving module, and send the basic aggregation information unit to a basic aggregation information storage module 1-(3).

23. The client according to any one of concepts 17 to 22, further comprising:

a basic aggregation information unit storage module 1-(3), comprising the following submodules:

a generated basic aggregation information unit receiving module 1-(3)-A, configured to receive the basic aggregation information unit sent by the generated basic aggregation information unit transferring module 1-(2)-C;

a database module 1-(3)-B, configured to store the basic aggregation information unit and the aggregated basic information unit; wherein with respect to each aggregated basic information unit, a data record stored therein comprises a value of a first identifier and information content of the basic information unit; the value of the first identifier is used for searching in the storage module for the stored data record of the basic information unit; with respect to each basic aggregation information unit, a data record stored therein comprises a value of a second identifier and the value of the first identifier of each aggregated basic information unit in the basic aggregation information unit, and first indication information indicating a relative location relationship of the aggregation basic information units during exhibition when the basic aggregation information unit is exhibited; and the first identifier and the second identifier may be the same identifier or may be the different identifiers; and a stored basic aggregation information unit sending module 1-(3)-C, configured to send the basic aggregation information unit to a basic aggregation information unit parsing module 1-(4).

24. A social network service system, comprising the following modules:

an aggregation instruction receiving module 1-(1), comprising the following submodules:

a predetermined operation interface exhibiting module 1-(1)-A, configured to provide a predetermined operation option of a basic information unit for a user on an interface where the basic information unit is exhibited;

a predetermined operation instruction receiving module 1-(1)-B, configured to: (i) receive an instruction from the user and acquire which basic information unit is an aggregated basic information unit selected by the user, wherein the selected basic information unit may be a basic aggregation information unit; (ii) receive an instruction from the user and acquire a setting made by the user for a location attribute of the selected basic information unit in an edited basic aggregation information unit, wherein the location attribute is used for describing a relative location information of the basic information unit and the other basic information units aggregated in the above basic aggregation information unit when the above basic aggregation information unit is exhibited;

an aggregation instruction information transferring module 1-(1)-C, configured to transfer the instruction received by the predetermined operation instruction receiving module 1-(1)-B to a basic aggregation information unit editing module 1-(2);

a basic aggregation information unit editing module 1-(2), comprising the following submodules:

a basic aggregation information unit composing module 1-(2)-A, configured to compose a basic aggregation information unit according to the instruction sent by the aggregation instruction receiving module;

an integrity setting module 1-(2)-B, configured to set an integrity attribute for a data recorder of the basic aggregation information unit composed by the basic aggregation information unit composing module 1-(2)-A, such that the basic aggregation information unit becomes a basic information unit which is integrally operable in logic, comprising being integrally selected as a piece of information, and being aggregated integrally as a piece of information;

a generated basic aggregation information unit transferring module 1-(2)-C, configured to send the basic aggregation information unit with integrity setting implemented by the integrity setting module 1-(2)-B to a basic aggregation information unit parsing module 1-(4);

1-(4) a basic aggregation information unit parsing module, configured to: receive the basic aggregation information unit sent by the basic aggregation information unit editing module 1-(2) or the basic aggregation information unit editing module; parse the basic aggregation information unit to an information format desired by a parsed basic aggregation information unit exhibiting module 1-(5); and transfer the information in the information format to the basic aggregation information unit exhibiting module 1-(5); and a parsed basic aggregation information unit exhibiting module 1-(5), comprising the following submodules:

a parsed basic aggregation information receiving module 1-(5)-A, configured to receive the information sent by the basic aggregation information unit parsing module 1-(4);

a foldedly exhibiting module 1-(5)-B, configured to foldedly exhibit the basic aggregation information unit; wherein when the basic aggregation information unit is foldedly exhibited, at least one of the aggregated basic information units therein is hidden; and an unfoldedly exhibiting module 1-(5)-C, configured to unfoldedly exhibit the basic aggregation information unit; wherein when the basic aggregation information unit is unfoldedly exhibited, in at least one unfolding state, the aggregated basic information unit is exhibited according to a relative location relationship required by the location attribute thereof recorded in the basic aggregation information unit.

25. The system according to concept 24, wherein (1) the location attribute of the aggregated basic information unit is described in the following manners: A. the basic aggregation information unit comprises at least one aggregated basic information unit set, the set having location attribute during display in at least one exhibition interface when the basic aggregation information unit is foldedly exhibited, the set comprising at least two aggregated basic information units; B. each aggregated basic information unit in the set has a sequential location when the aggregated basic information unit is displayed, wherein relative locations when the aggregated basic information units in the set are exhibited in an unfoldedly exhibition state would be in accordance with the sequential location;

(2) the predetermined operation of 1-(1) the aggregation instruction receiving module further comprises at least one of the following operations: A. duplicating one aggregated basic information unit set, and generating a new aggregated basic information unit set; B. selecting an aggregated basic information unit in the new set; C. adding a new aggregated basic information unit into the new set; D. adjusting sequential locations of the aggregated basic information units in the new set; E. deleting an aggregated basic information unit in the new set; F. performing an aggregation operation for the aggregated basic information unit set, comprising adding one set into another set;

(3) the basic aggregation information unit editing module 1-(2) further comprises the following submodule: an aggregation-related editing module 1-(2)-D, configured to perform the above predetermined operation according to an instruction sent by the aggregation instruction receiving module; and (4) the basic information unit is allowed to use the following information structure: content proactively input by the user only comprises texts, or only comprises texts and symbols.

26. The system according to concept 24 or 25, comprising:

(1) an information providing module, configured to provide an operation interface for acquiring system internal information and/or system external information for the user to acquire corresponding information, and provide an exhibition interface to exhibit information to the user; wherein (2) the exhibition interface suitable for the predetermined operation of the aggregation instruction receiving module comprises (1) at least one exhibition interface exhibiting the basic information unit in the information exhibition interface.

27. The system according to concept 26, wherein
the aggregation instruction receiving module 1-(1) further comprises the following submodule:
a non-basic information unit predetermined interface exhibiting module 1-(1)-D, configured to provide a predetermined operation option with respect to the information for the user on an interface exhibiting information of the non-basic information unit, comprising at least one or any combination of the following predetermined operations: (i) editing a basic information unit for the user according to the information and using the basic information unit as an aggregated basic information unit; and (ii) editing a basic information unit draft for the user according to the user and providing an editing interface for the user such that the user uses the edited basic information unit as the aggregated basic information unit.

BRIEF DESCRIPTION OF THE DRAWINGS

in FIG. 1, a dotted line block 110 denotes a text region of the short-text information and exhibits text content 115 of the short-text information; the text region exhibits a virtual button 101 corresponding to an aggregated short-text information set; a picture 111 represents the releaser "Mr. Zhang" of the short-text information; 109 represents a release time of the short-text information; a virtual button 105 "forward (1)" is represented by text, wherein when a user clicks this button, an interface as illustrated in FIG. 3 for a further forward operation would be exhibited according to the embodiment, the text button comprises a text portion "(1)", and the digit 1 means that the short-text information has been forwarded for one time before; a virtual button 107 "comment (2)" is represented by text, wherein when a user clicks this button, an interface for further forward operation and a text portion "(2)" in the text button are exhibited according to the embodiment, digit 2 means that the short-text information has been commented twice; "Mr. Zhang" represented by a dotted line block 113 is a nickname of the releaser of the short-text information, and represents that the short-text information is released by Mr. Zhang;

in FIGS. 14, 1401 and 1405 respectively represent two aggregation short-text information drafts, an icon 1410 represents an aggregated short-text information set draft added into the aggregation short-text information draft, and 1415 and 1420 respectively represent aggregated short-text information set drafts directly composed by two users;

DETAILED DESCRIPTION

Embodiment 1 (Preferred Embodiment)

Disclosed herein is a social network system in which a user is capable of releasing aggregation short-text information, for example, the aggregation short-text information is supported via improvements made to such a social network as Facebook, Sina Microblog, Twitter and the like. The short-text information described herein refers to In the system, the aggregation short-text information is a piece of short-text information, and the information is at least added with an aggregated short-text information set, wherein the set at least comprises two or more than two pieces of short-text information. The aggregated short-text information may be all existing short-text information, or may be all newly composed short-text information; and optionally, a part of the aggregated short-text information may be existing short-text information and the remaining thereof may be newly composed short-text information. The newly composed short-text information mentioned herein refers the short-text information which is not released to the network system before being added into the aggregated short-text information set. The existing short-text information mentioned herein refers the short-text information which has been released to the network system before being added into the aggregated short-text information set. The term "release" mentioned herein comprises releasing the short-text information as an independent piece of short-text information and releasing the short-text information as the aggregated short-text information in the aggregation short-text information with the release of the aggregated short-text information. The aggregation short-text information may also, as the aggregated short-text information, be added to an aggregated short-text information set to which another piece of aggregation short-text information is added.

Figure 6:
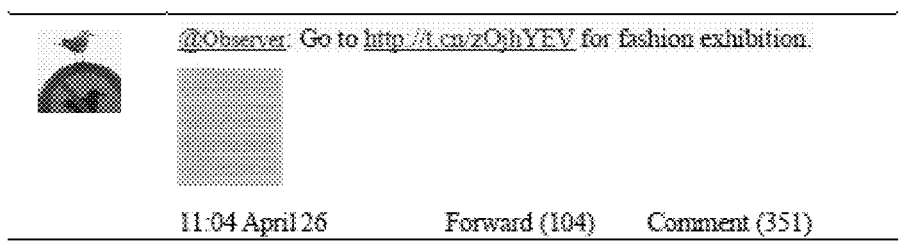
FIG. 6 is a schematic diagram of multimedia short-text information according to an embodiment of the present invention.

The system allows a user to release non-aggregation short-text information as a piece of independently released short-text information. Such non-aggregated information comprises: simple text short-text information, that is, the content proactively input by the user releasing the information does not contain such multimedia content as pictures, videos and the like, for example, the content is constituted by texts only, or by texts and symbols only, still for example, the content is constituted by texts, punctuations and emoticons; complicated multimedia short-text information, that is, the content proactively input by the user releasing the information contains such multimedia content as pictures and/or videos and the like, for example, the short-text information as illustrated in FIG. 6.

In the system, after the short-text information and the aggregation short-text information are released, when the releaser modifies the information, the system still stores the record before the modification, and directly displays the content upon the modification when the short-text information and the aggregation short-text information are exhibited. In addition, the system provides a mark indicating that the information has been modified, and also provides an option, for example, a button, a gesture action and the like to allow the user to instruct the system to exhibit the origin of the information when the information is being displayed.

Figure 8:
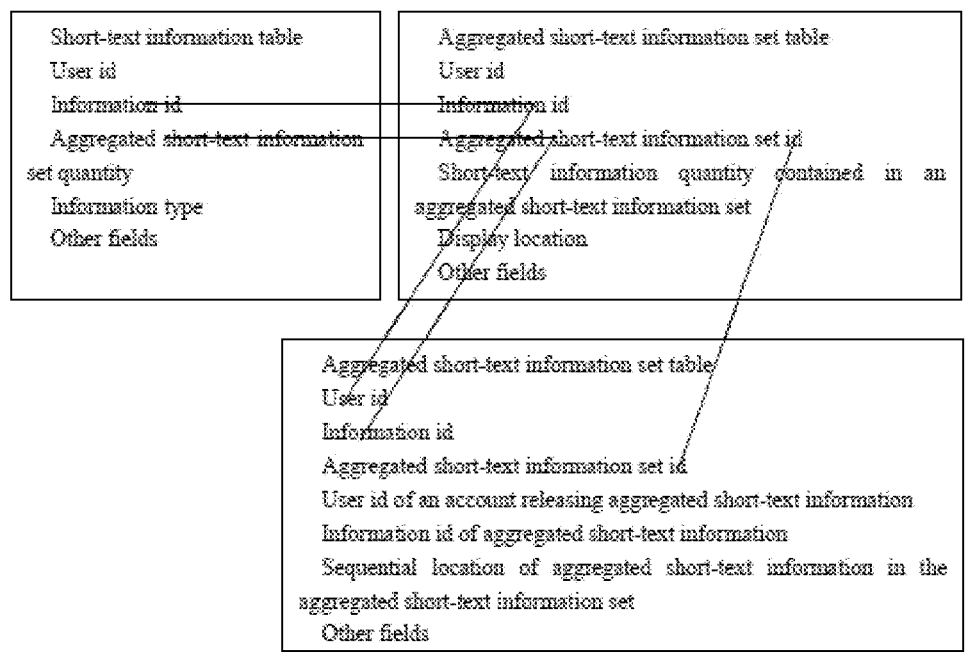
FIG. 8 is a schematic diagram a data structure related to the present invention in a server database according to a preferred embodiment of the present invention.
Figure 9:
FIG. 9 is a schematic diagram of a piece of aggregated short-text information comprising three aggregation short-text information sets according to an embodiment of the present invention.

The data structure as illustrated in FIG. 8 is established in a database of a system server, wherein the system server stores, via this data structure, the short-text information and the aggregation short-text information released by the user. In this database, each piece of short-text information is collaboratively determined according to a user ID of an information release account and an information ID under the user ID, and however, it is not necessary that each piece of short-text information has a unique information ID in the database. One record in the short-text information table corresponds to a piece of short-text information. The field "information type" in the short-text information table is used for recording whether the information is short-text information is originally created by the user, or comment information with respect to another piece of short-text information, or a piece of forwarded short-text information, or a piece of draft information, or a piece of released information. In this embodiment, to support the user to release the aggregation short-text information, a field "aggregated short-text information set quantity" is defined in the short-text information table. If one piece of short-text information is not the aggregation short-text information, the value of this field is zero; if the short-text information is only added with one aggregation short-text information set, the value of this field is 1; and if the short-text information is only added with two aggregation short-text information sets, the value of this field is 2, and so on. An aggregated short-text information set table is also defined in the database. Each record corresponds to an aggregated short-text information set, which is collaboratively determined according to a user ID of an information release account of aggregation short-text information, an information ID corresponding to the aggregation short-text information under the user ID and an aggregated short-text information set ID under the aggregation short-text information. For example, as illustrated in FIG. 9, the aggregation short-text information totally has three aggregation short-text information sets, the aggregation short-text information set corresponding to each virtual button corresponds to an aggregated short-text information set ID, the field "display location" is used for recording a display location of a display agent object (for example, 101 exhibited in FIG. 11) of an aggregation short-text information set defined when the user edits the aggregation short-text information set during exhibition, for example, a location following the $N^{th}$ character in the text portion. Additionally, an aggregated short-text information table is defined in the database. Each record corresponds to a piece of aggregated short-text information, which is collaboratively determined according to a user ID of an information release account of the short-text information, an information ID of the aggregation short-text information, an aggregated short-text information set ID of the aggregated short-text information set to which the aggregation short-text information pertains, an user ID of an information release account of the aggregated short-text information and an information ID of the aggregated short-text information under the user ID. The field "sequential location of aggregated short-text information in aggregated short-text information set" is used for recording a sequential location of the aggregated short-text information in the aggregated short-text information set. If a piece of aggregated short-text information is located at the location of the first piece of information in the aggregated short-text information set, the value of this field is 1; and if a piece of aggregated short-text information is located at the location of the second piece of information in the aggregated short-text information set, the value of this field is 2, and so on. If a piece of aggregated short-text information is added into an aggregated short-text information set, a corresponding record is accordingly added into an aggregated short-text information table; and if a piece of aggregated short-text information is deleted from the aggregated short-text information set, a corresponding record is accordingly deleted from the aggregated short-text information table. However, these operations do not affect the record of the corresponding short-text information in the short-text information table.

In this embodiment, the sequential location of the aggregated short-text information in the aggregated short-text information set is essentially determined in a one-dimensional space. For example, if a piece of aggregated short-text information is located before another piece of aggregated short-text information in the one-dimensional space, then by using such information of the sequential location, as long as a specific shape of the one-dimensional space is firstly used in the corresponding virtual exhibition page, for example, from the top to the bottom or from the left to the right, or determining the specific shape of the one-dimensional space on the page by using the shape of broken lines or curved lines, then the aggregated short-text information may be exhibited according to the sequential location defined by the user. However, in a less preferred embodiment derived from this embodiment, the sequential location signifies relative locations of aggregated short-text information defined in a two-dimensional location space. When a user edits an aggregation short-text information set, relative locations of the aggregated short-text information are respectively defined in the X direction and the Y direction, for example, defining that aggregated short-text information A is prior to aggregated short-text information B in the X direction, and is behind the aggregated short-text information B in the Y direction.

Figure 1:
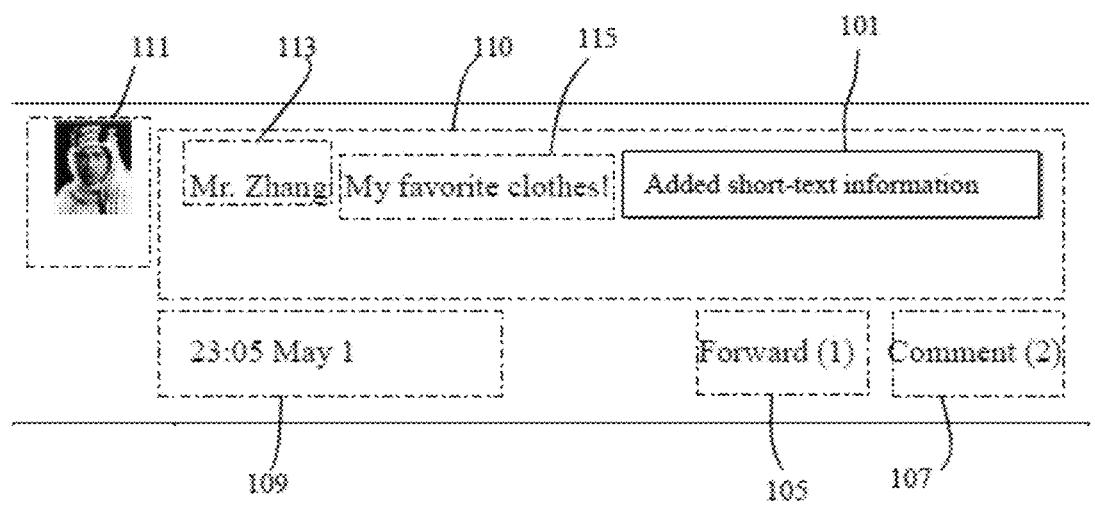
FIG. 1 is a schematic diagram of an exhibition state of a piece of aggregation short-text information according to an embodiment of the present invention.
Figure 2:
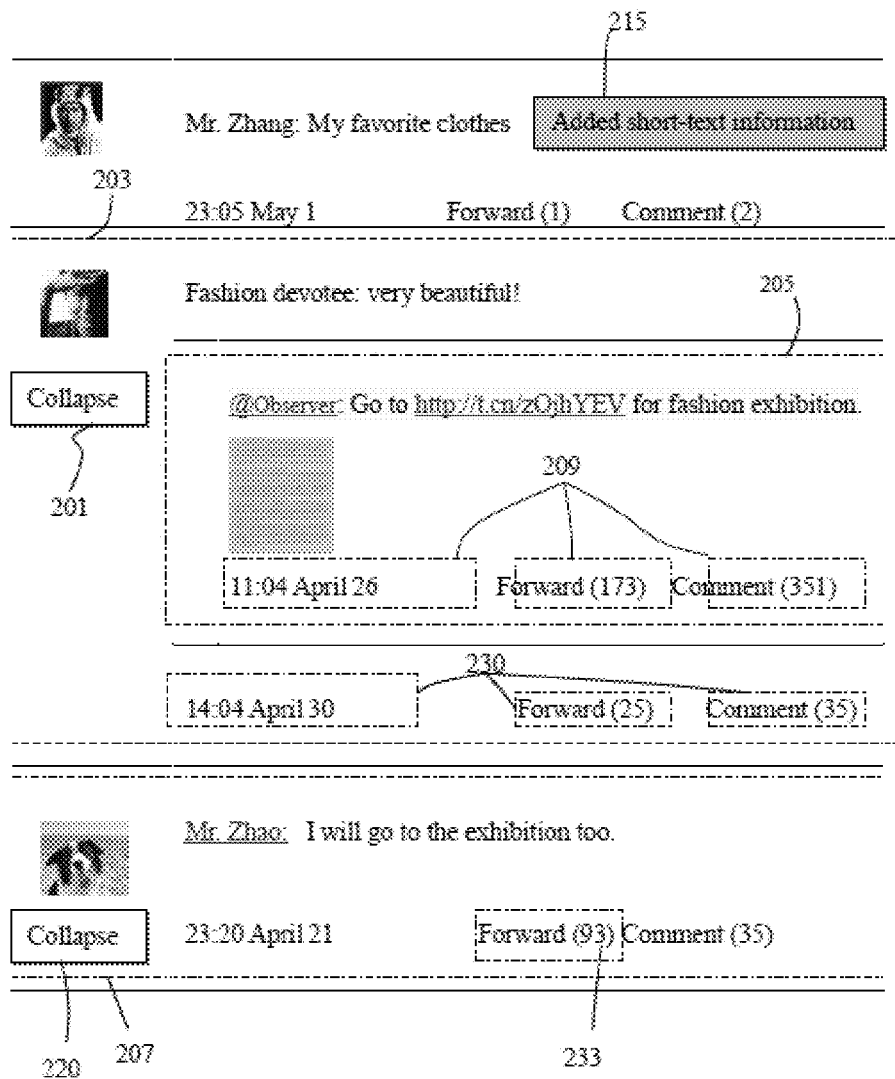
FIG. 2 is a schematic diagram of unfoldedly exhibition of the aggregation short-text information as illustrated in FIG. 1; the button represented by reference sign 215 corresponds to the button 101 in FIG. 1, and changes of the color thereof reflect that the aggregation short-text information set is unfoldedly exhibited; a dotted line block 203 represents short-text information forwarded by a user "fashion devotee" who also forwards the forwarded short-text information represented by a dotted line block 205, and adds comment information "very beautiful" when forwarding, and the short-text information is a piece of short-text information included in an aggregated short-text information set 215; short-text information represented by a dotted line block 207 is another piece of aggregated short-text information included in aggregated short-text information set 215; objects represented by 230 and 209 are the same as the objects as illustrated in FIG. 1, which are respectively a forwarding virtual button and a comment virtual button when the corresponding short-text information is released; 201 and 220 represent a virtual button "collapse", and by clicking this virtual button, the aggregation short-text information is re-exhibited in a folding state.
Figure 3:
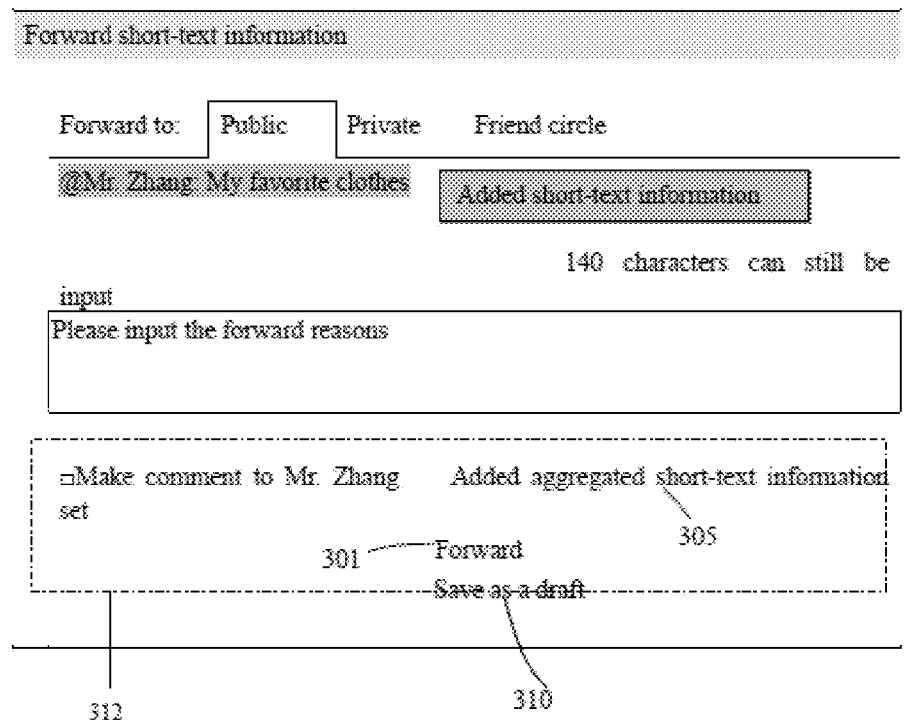
FIG. 3 is a schematic diagram of an operation interface of the aggregation short-text information as illustrated in FIG. 1 which is forwarded by a user account Mr. Li according to a preferred embodiment of the present invention; the user may add the aggregated short-text information set into the forwarded aggregation short-text information by selecting an option "add an aggregated information set", or may forward the aggregation short-text information released by Mr. Zhang by selecting an option "forward", or may store the aggregation short-text information forwarded during editing as a draft by selecting an option 310; a dotted line block 312 represents an option bar constituted by a text virtual button and a check option.
Figure 4:
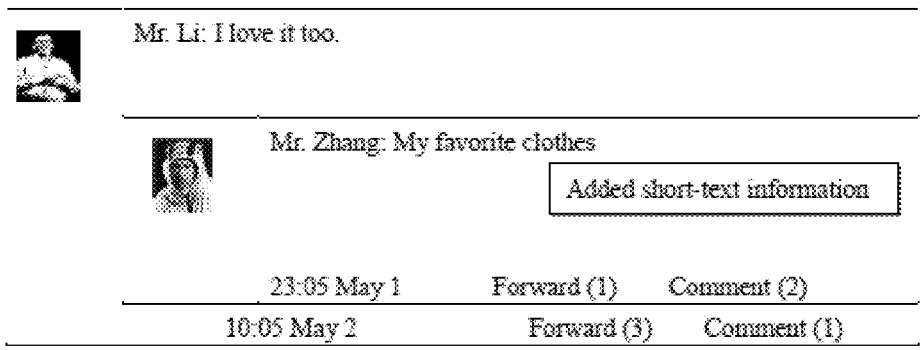
FIG. 4 is a schematic diagram of a piece of forwarded short-text information according to an embodiment, wherein the forwarded short-text information is a piece of aggregation short-text information, and comment information "I will also go to the exhibition" is added during forwarding.
Figure 5:
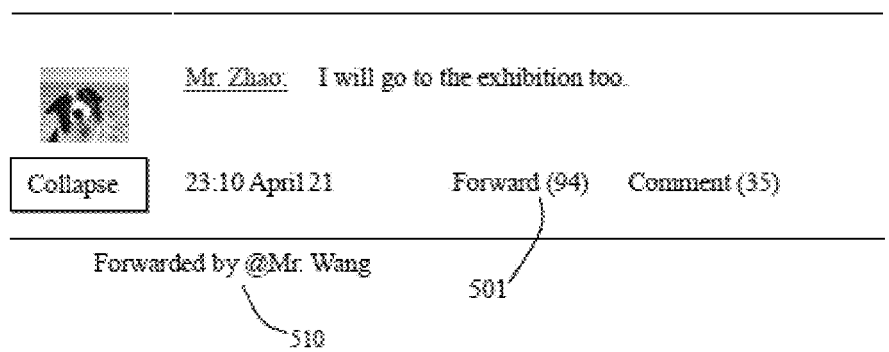
FIG. 5 is a schematic diagram of forwarded short-text information with no comment information added during forwarding.
Figure 10:
FIG. 10 is a schematic diagram of aggregation short-text information in a unfolding state according to an embodiment of the present invention; wherein an aggregated short-text information set is added into the aggregation short-text information; the information set is formed of three pieces of aggregated short-text information; a dotted line block 1001 represents a piece of newly composed short-text information; and with respect to the newly composed short-text information in the aggregated short-text information, the system allows a user to forward and make comments on the existing short-text information, for example, when the user clicks a virtual button 1005, a client would provide an interface for a forward operation with a schematic diagram similar to that illustrated in FIG. 3 for the user.

When the server ends the aggregation short-text information released by the user to a client used by the information receiver, the server communicates with the client, such that the client exhibits the aggregation short-text information in the following manner according to data received from the server. The data mentioned herein comprises data related to the content of the aggregation short-text information and data related to the format of the aggregation short-text information, for example, sending a file in a predetermined exhibition format, a file composed by using the HTML language; and also comprises data of a program which is sent by the server to the client and is to be run on the client where necessary, for example, a program compiled via JavaScript contained in the data sent by the server to the browser client in this case. The above described manner of exhibiting the aggregation short-text information is as follows: a default exhibition state of the aggregation short-text information is a folding state, and in the folding state, the aggregation short-text information is visually exhibited to the user as a piece of short-text information; if the content proactively input by the user apart from the aggregated short-text information set of the aggregation short-text information is not null, when the aggregation short-text information is exhibited in the folding state, the aggregated short-text information contained in the aggregation short-text information set is not exhibited, as illustrated in FIG. 1; the virtual button represented by 101 in FIG. 1 corresponds to an aggregated short-text information set, wherein the aggregated short-text information set is constituted by two pieces of aggregated short-text information, and during exhibition of these two pieces of aggregated short-text information, the first piece of aggregated short-text information is a piece of forwarded short-text information released by the user "fashion devotee", and the second aggregated short-text information is a piece of short-text information released by the user "Mr. Zhao", and these two pieces of short-text information are existing short-text information. If the user clicks the virtual button 101, the client unfoldedly exhibits the aggregation short-text information in the aggregated short-text information set, as illustrated in FIG. 2. If the aggregated short-text information set contains a large amount of aggregated short-text information, and if the system uses a PC browser as a client, the client provides a scroll bar, the user controls the scroll bar by using the mouse and issues an instruction, and the client unfoldedly exhibits all the aggregated short-text information via the movement of a virtual exhibition page. If the system uses an APP on a mobile phone as a client, the client allows the user to move a virtual exhibition page on the screen by using fingers, and thus all the aggregated short-text information is unfoldedly exhibited via the movement of the virtual exhibition page. The client provides a corresponding user interface for the user, such that the user forward and make comments on the aggregated short-text information as the general short-text information. For example, if the virtual forwarding button 105 in FIG. 5 is clicked, the client provides a user interface for a forward operation, as illustrated in FIG. 3. Using this interface, if the user does not input any comment information but directly clicks a virtual key button 301 therein, the system would forward the forwarded aggregation short-text information to the system, and note that the information is forwarded by the user; and if the user inputs some comment information and then clicks the virtual button 301, the system would send the forwarded short-text information as illustrated in FIG. 4. With respect to the aggregated short-text information of the aggregation short-text information exhibited in the unfolding state, the user may also forward or make comments on the information as the independently released short-text information. For example, in the interface as illustrated in FIG. 2, a user "Mr. Wang" click a virtual forward button represented by 233, and the client provides a interface for a forward operation similar to that illustrated in FIG. 3; and if the user notes via the interface that he or she would make no comment information, the system would forward the corresponding aggregated short-text information, as illustrated in FIG. 5. As illustrated in FIG. 5, changes of 501 relative to 233 in FIG. 2 indicate that the related short-text information has been forwarded once according to a counting rule defined in the system. In FIG. 5, 510 represents indication information added by the system, which indicates that the short-text information is forwarded by the user "Mr. Wang". FIG. 10 is a schematic diagram of aggregation short-text information in a unfolding state; wherein an aggregated short-text information set is added into the aggregation short-text information; the information set is formed of three pieces of aggregated short-text information; a dotted line block 1001 represents a piece of newly composed short-text information; and with respect to the newly composed short-text information in the aggregated short-text information, the system allows a user to forward and comment on the existing short-text information, for example, when the user clicks a virtual button 1005, a client would provide an interface for a forward operation with a schematic diagram similar to that illustrated in FIG. 3 for the user. If the content proactively input by the user apart from the aggregated short-text information set of the aggregation short-text information is null, when the aggregation short-text information is exhibited in the folding state, the aggregation short-text information contained in the aggregation short-text information set and having a sequential location 1 in the set.

Figure 7:
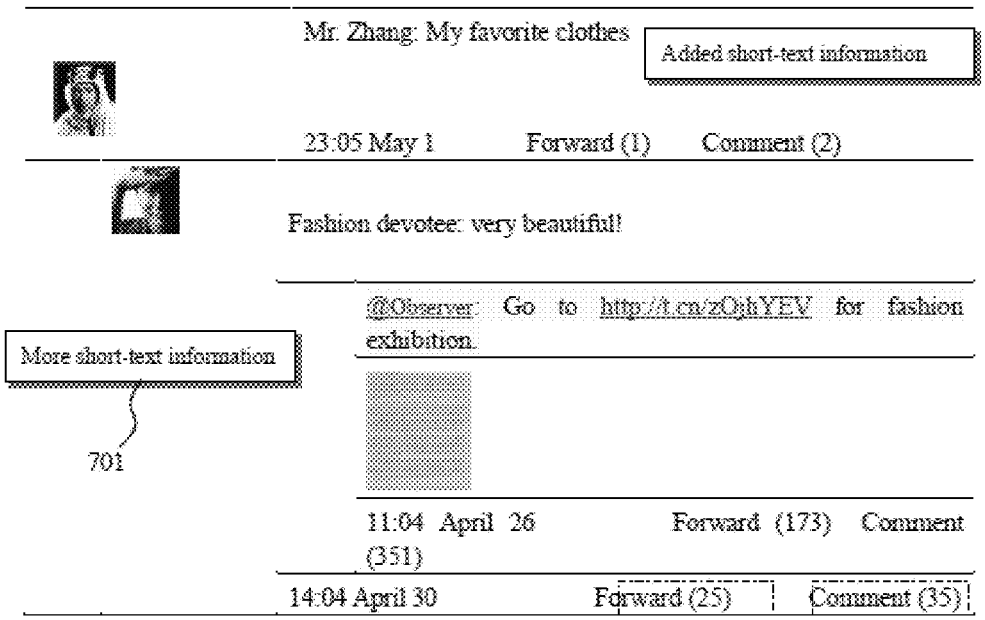
FIG. 7 is a schematic diagram illustrating the scenario where a piece of aggregated short-text information in an aggregated short-text information set thereof is exhibited when the aggregation short-text information is in a folding state according to a non-preferred embodiment of the present invention; wherein by clicking a virtual button represented by 701, more aggregated short-text information may be exhibited according to the embodiment.

In a less preferred embodiment derived from this embodiment, one piece of aggregated short-text information in the aggregated short-text information set of the aggregation short-text information is also exhibited in the folding mode, for example, a piece of aggregation short-text information absolutely identical to the aggregation identical as illustrated in FIG. 1. In this derivative embodiment, the folding state is as illustrated in FIG. 7. In another less preferred embodiment derived from this embodiment, for example, the folding state of a piece of aggregation short-text information absolutely identical to the aggregation short-text information as illustrated in FIG. 1 is similar to that illustrated in FIG. 1. However, the text displayed on the virtual button (101) therein is modified to a summary constituted by several front characters of the first pieces of aggregation short-text information plus the number of pieces of aggregated short-text information contained in the aggregated short-text information set, for example "@fashion devotee: very beautiful! (two pieces of short-text information).

The system client comprises: a content editing module, an aggregation information generating module and a releasing module. The content editing module is configured such that a user manually inputs information and inputs information by means of duplicating and pasting, including content which needs to be proactively input for inputting newly composed information and the content which the user desires to proactively input in the aggregation short-text information. The aggregation information generating module is configured to add aggregated short-text information into an aggregated short-text information set according to an instruction of the user to compose an aggregation short-text information set, and add the aggregated short-text information set into the aggregation short-text information according to the instruction of the user to edit the aggregation short-text information. The releasing module is configured to submit the aggregation short-text information to a server.

Figure 11:
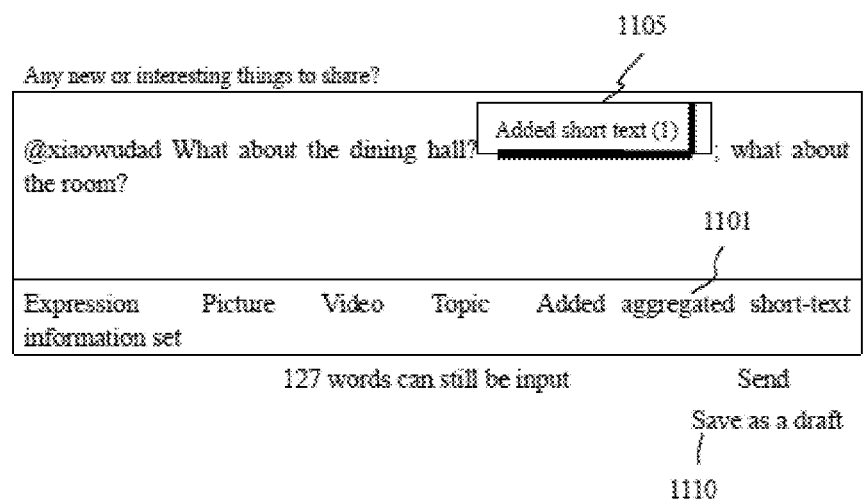
FIG. 11 is a schematic diagram of a user interface for editing and releasing aggregation short-text information which is provided by a client to a user according to an embodiment of the present invention.

A user interface provided by a client of the system for a user such that the user edits and releases aggregation short-text information is as illustrated in FIG. 11. If the user clicks the virtual button "add aggregated short-text information set", the user interface exhibits a virtual button corresponding to a to-be-edited aggregated short-text information set.

The "added short text (1)" 1105 is a schematic diagram of such a virtual key button. The user may adjust the location of the virtual button in the text portion of the aggregation short-text. When the user clicks the virtual button 1110 "save as draft" in FIG. 11, the system saves the draft of the aggregation short-text information and the draft of the aggregated short-text information set added therein, and FIG. 12 is a schematic diagram of such a draft.

Figure 13:
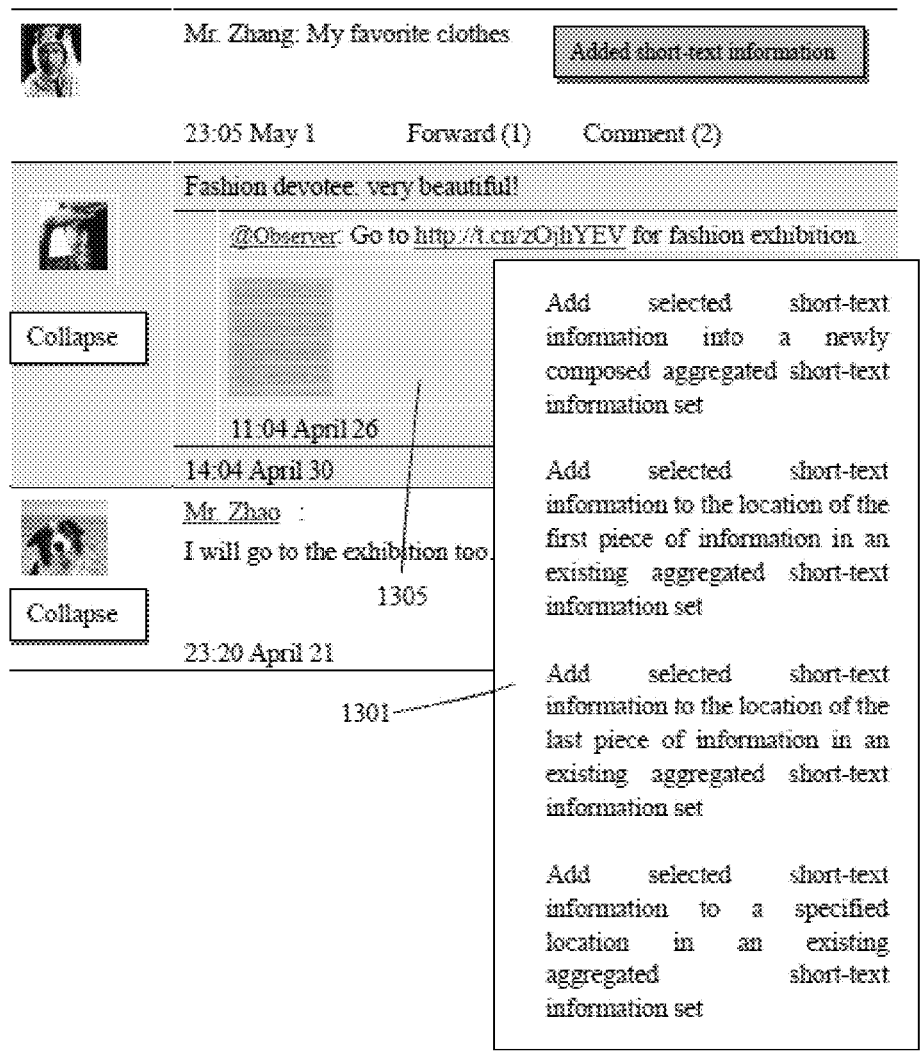
FIG. 13 is a schematic diagram of a user interface according to an embodiment of the present invention, which is used for performing a corresponding operation for aggregated short-text information in an interface where aggregation short-text information is unfoldedly exhibited.
Figure 14:
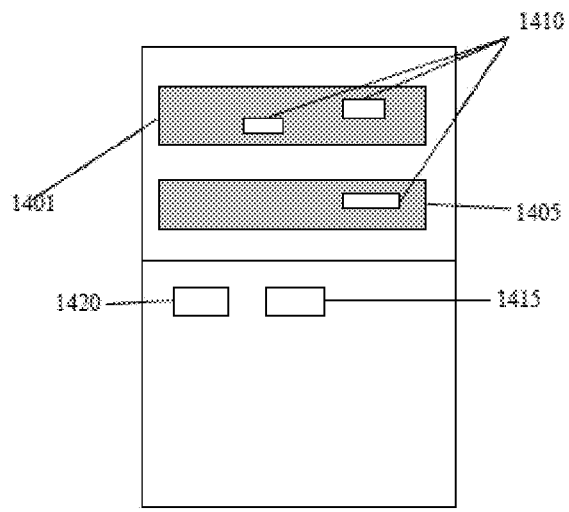
FIG. 14 is a schematic diagram of a user interface of a draft library according to an embodiment of the present invention.
Figure 15:
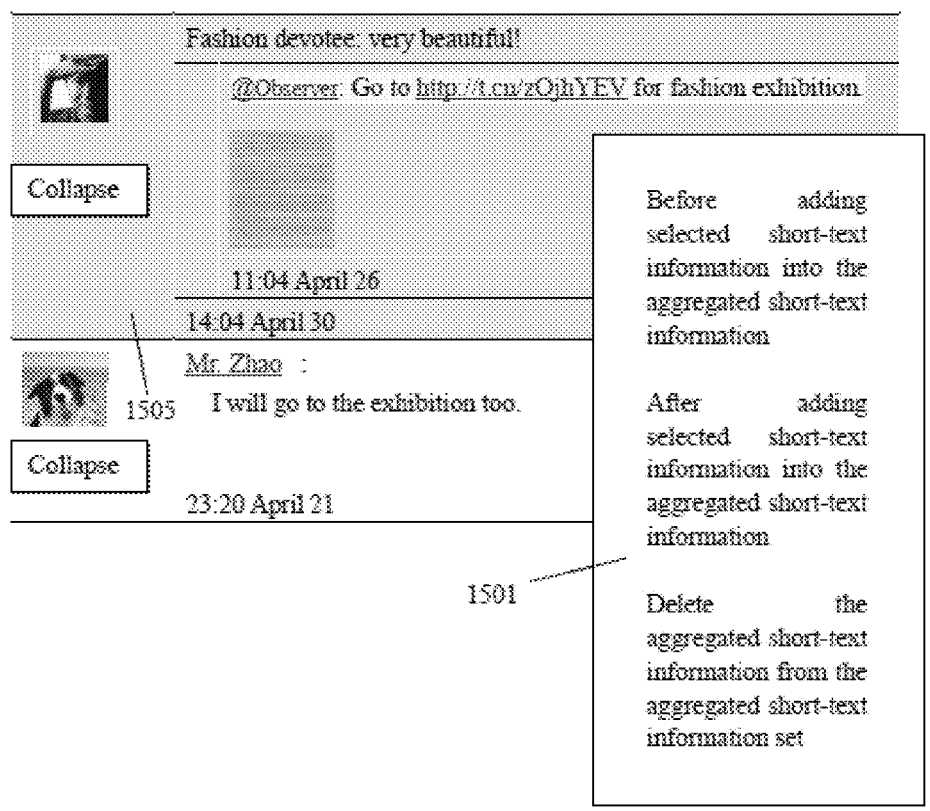
FIG. 15 is a schematic diagram of a user interface according to an embodiment of the present invention, which is used for performing a corresponding operation in an aggregated short-text information set which is unfoldedly exhibited.

The client further provides an option, for example, firstly a touch control gesture option for the user to directly compose a draft of the aggregated short-text information set, with no need to simultaneously edit the aggregation short-text information. For example, when the user browses short-text information on a smart phone, the user, via a touch control gesture, for example, slides right with fingers in a region displaying a piece of short-text information on the touch screen. In this case, the client senses and identifies that the user selects a touch control gesture option, and then exhibits a corresponding user interface to the user such that the user may make further editing. FIG. 13 is a schematic diagram thereof, wherein 1305 represents short-text information which is added to an aggregated short-text information set by the user according to the instruction of the touch control gesture option, and 1301 represents a selection menu. If the user selects in 1301 "add selected short-text information into newly composed aggregated short-text information set", the client newly creates an aggregated short-text information set draft for the user, and then adds the short-text information into the created aggregated short-text information set. If the user selects in 1301 "add selected short-text information into first piece of information location of existing aggregated short-text information set", the client exhibits a user interface as illustrated in FIG. 14 to the user. As illustrated in FIGS. 14, 1401 and 1405 respectively represent two drafts of the aggregation short-text information, 1410 represents an aggregated short-text information set draft added into the aggregation short-text information draft, and 1415 and 1420 respectively represent aggregated short-text information set drafts composed by the user. When the user taps with the finger the corresponding aggregated short-text information set draft in the interface as illustrated in FIG. 14, the client requires the user to reconfirm this instruction. Upon confirmation by the user, the client adds the previous indicated short-text information to the corresponding location in the aggregated short-text information set. If the user selects in 1301 "add selected short-text information into a designated location of existing aggregated short-text information set", and indicates a corresponding aggregated short-text information set draft in the user interface as illustrated in FIG. 14, the client unfoldedly exhibits the aggregated short-text information set draft. After the user taps with fingers in a display region of a piece of aggregated short-text information, the client exhibits, for example, the user interface as illustrated in FIG. 15, to the user, wherein 1505 represents the aggregated short-text information indicated by tapping with fingers by the user and the client automatically highlight the aggregated short-text information, and 1501 is a selection menu provided by the client to the user in this case, and after the user makes an instruction via the menu, the client adds the previously designated short-text information into a designated location in the aggregated short-text information set draft.

Figure 12:
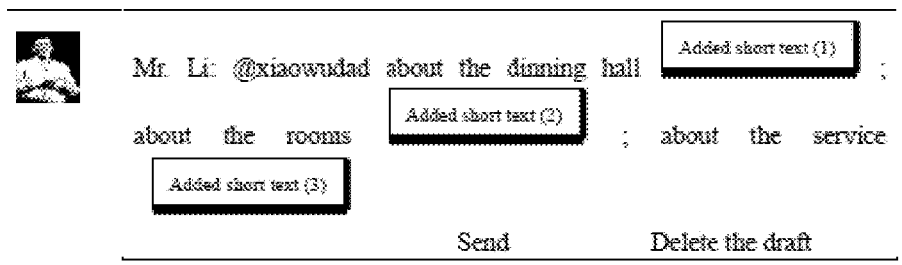
FIG. 12 is a schematic diagram of an aggregation short-text information draft according to an embodiment of the present invention.

The client provides an option for the user to perform an aggregate operation for the aggregated short-text information set, for example, the user edits the aggregated short-text information set by duplicating the aggregated short-text information in the existing aggregation short-text information. For example, when the user browsers, on a smart phone, a piece of aggregation short-text information, for example, in the user in interface as illustrated in FIG. 1, the user, via a gesture, for example, presses the virtual button corresponding to an aggregated short-text information set represented by 101, the client exhibits a menu to the user, wherein options "duplicate this aggregated short-text information set and store it into a draft", "duplicate this aggregated short-text information set, modify it and store it into a draft", "add this aggregated short-text information set into an existing aggregated short-text information set draft" and "delete from an existing aggregated short-text information set the aggregated short-text information which pertains to the aggregated short-text information set" are configured in the menu. In the above menu, (1) if the user selects the option "duplicate this aggregated short-text information set and store it into a draft", the client creates an aggregated short-text information set draft, and add various pieces of aggregated short-text information in the aggregated short-text information set represented by 101 into the newly created aggregated short-text information set draft, wherein the sequential locations of the various pieces of aggregated short-text information in the aggregated short-text information set draft are recorded in accordance with the sequential locations thereof in the aggregated short-text information set represented by 101; (2) if the user selects the option "duplicate this aggregated short-text information set, modify it and store it into a draft", the client creates an aggregated short-text information set draft, and add various pieces of aggregated short-text information in the aggregated short-text information set represented by 101 into the newly created aggregated short-text information set draft, wherein the sequential locations of the various aggregated short-text information in the aggregated short-text information set draft are recorded in accordance with the sequential locations thereof in the aggregated short-text information set represented by 101, the aggregated short-text information set draft is unfoldedly exhibited, and the user interface as illustrated in FIG. 15 is exhibited to the user such that the user makes corresponding modification and editing; (3) if the user selects the option "add this aggregated short-text information set into an existing aggregated short-text information set draft", the client exhibits the user interface as illustrated in FIG. 14 to the user, when the user, in the user interface as illustrated in FIG. 14, for example, taps with fingers the corresponding aggregated short-text information set draft, for example, tapping the aggregated short-text information set draft represented by 1420, the client exhibits the aggregated short-text information set draft to the user; when the user selects a piece of aggregated short-text information, the client exhibits the user interface as illustrated in FIG. 15 to the user, such that the user makes a selection in the menu represented by 1501, for example, the user selects the option "add the selected short-text information before the aggregated short-text information"; the client requests the user to make a confirmation, after the user confirms this instruction, the client adds all the aggregated short-text information in the aggregated short-text information represented by 101 into the aggregated short-text information set represented by 1402; the sequential locations of all the aggregated short-text information are recorded as before the aggregated short-text information represented by 1505, and the relative sequential locations of the added aggregated short-text information in the aggregate short-text information set represented by 1420 are recorded as the same as the relative sequential locations thereof in the aggregated short-text information set represented by 101; (4)

if the user selects the option "delete from an existing aggregated short-text information set the aggregated short-text information which pertains to the aggregated short-text information set", the client exhibits the user interface as illustrated in FIG. 14 to the user, when the user, in the user interface as illustrated in FIG. 12, for example, taps the corresponding aggregated short-text information set draft with fingers, for example, tapping the aggregated short-text information set draft represented by 1420, the client requests the user to confirm this selection, and after the user makes a confirmation, the client makes corresponding modifications, and all the aggregated short-text information in the aggregated short-text information set draft represented by 1420 is deleted from the aggregated short-text information set draft represented by 1420 as long as the aggregated short-text information pertains to the aggregated short-text information set represented by 101.

Figure 16:
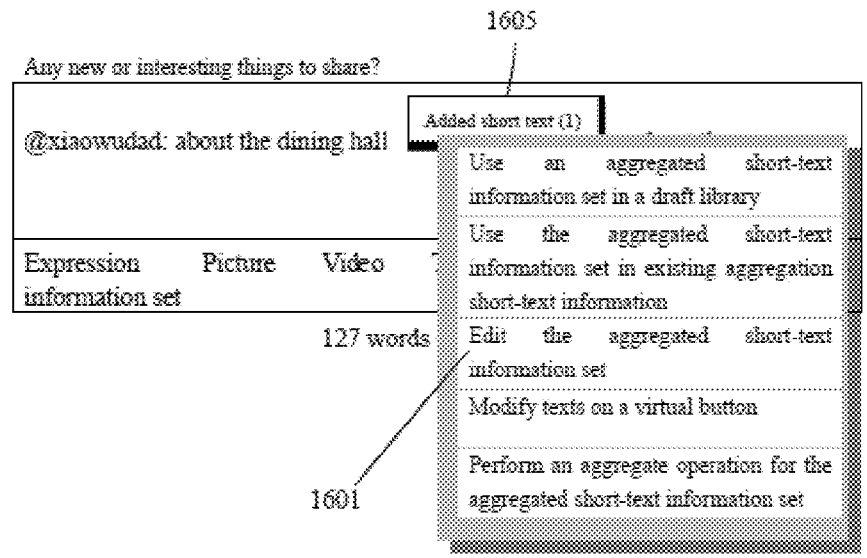
FIG. 16 is a schematic diagram of a user interface according to an embodiment of the present invention, which is used for performing a corresponding operation in an aggregated short-text information set in a folding state.

This client allows the user to use an edited aggregated short-text information set draft as an added aggregated short-text information set therein during editing aggregation short-text information. For example, in the user interface as illustrated in FIG. 11, the user, for example, presses with fingers the virtual button represented by 1105, the client exhibits the user interface as illustrated in FIG. 16 to the user. In the menu represented by 1601, if the user selects the option "use an aggregated short-text information set in a draft library", the client exhibits the user interface as illustrated in FIG. 14, and after the user selects therein, for example, the aggregated short-text information set draft represented by 1420, the client duplicates the content of the aggregated short-text information set draft to the aggregated short-text information set represented by 1605.

The client allows the user to edit the aggregated short-text information set draft in the draft library. For example, when the user, in the user interface as illustrated in FIG. 12, presses with fingers a virtual button 1201 "added short text (1)", the client exhibits the menu represented by 1601 as illustrated in FIG. 16 to the user. With respect to this menu, A. if the user selects an option "edit an aggregated short-text information set", the client unfoldedly exhibits the corresponding aggregated short-text information set, and exhibits the user interface as illustrated in FIG. 15 to the user; if the user selects an option "add the selected short-text information before the aggregated short-text information" and does not specify the selected short-text information before, the client provides an short-text browse selection interface for the user to specify therein the selected browser interface for exhibiting the short-text information to the user; if the system has a plurality of browser pages for exhibiting the short-text information, the user is allowed to make a selection, and meanwhile change the background color of the page, for example, using a background color darker than the color in a normal browsing state to remind the user of the current editing state; in the editing state, when the user slides to the right with fingers in a display region displaying a piece of short-text information, the client inquires the user whether to add this short-text information into the edited aggregated short-text information set; after the user makes a confirmation, the client completes the editing, and inquires whether to continue editing the aggregated short-text information set; if the user selects to continue the editing, the client continues providing the short-text browse selection interface, such that the user indicates a next piece of short-text information to be added to the aggregated short-text information set; B. if the user selects an option "perform an aggregate operation for aggregated short-text information sets", the client exhibits a menu to the user, wherein options "duplicate this aggregated short-text information set and store it into a draft", "duplicate this aggregated short-text information set, modify it and store it in a draft", "add this aggregation short-text information set into an existing aggregated short-text information set draft", and "delete from an existing aggregated short-text information set the aggregated short-text information which pertains to the aggregated short-text information set" are configured in the menu, and the client makes corresponding processing according to the user's selection; C. if the user selects "modify text in a virtual button", the client provides a corresponding user interface to allow the user to modify the text on the virtual button.

The client allows the user to edit the aggregation short-text information draft in the draft library. For example, if the user, in the user interface as illustrated in FIG. 14, taps with fingers the aggregation short-text information draft represented by 1405, the client exhibits the user interface as illustrated in FIG. 12 to the user; in this user interface, the user may edit the aggregation short-text information, for example, modifying text content therein, moving a corresponding location of the virtual button of the aggregation short-text information set, modifying text content on the virtual button, adding or deleting pictures, videos, geographical locations and the like in the aggregation short-text information.

Figure 17:
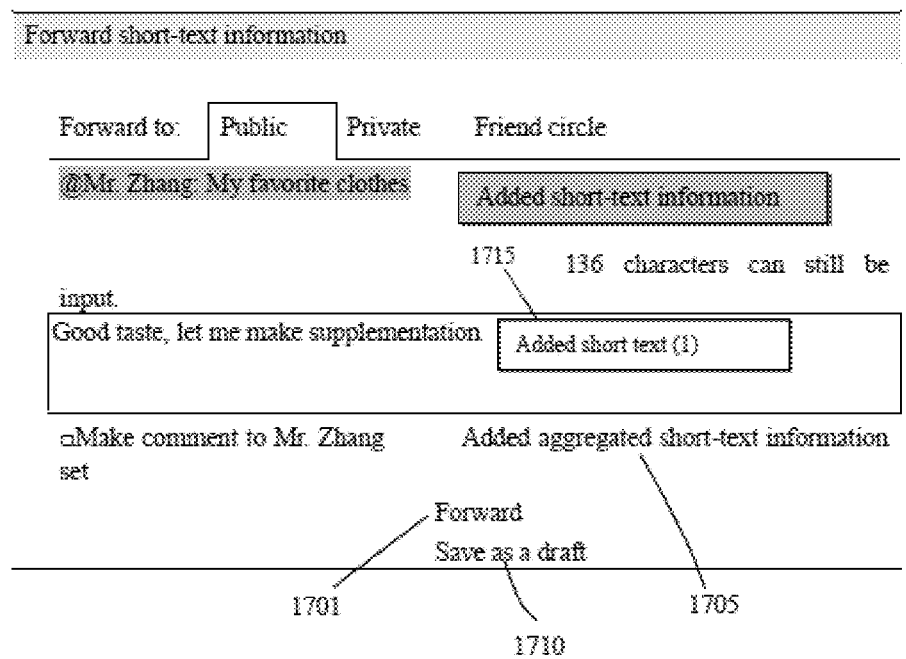
FIG. 17 is a schematic diagram of a user interface where an aggregated short-text information set is added into added comment information which is forwarded according to an embodiment of the present invention.
Figure 18:
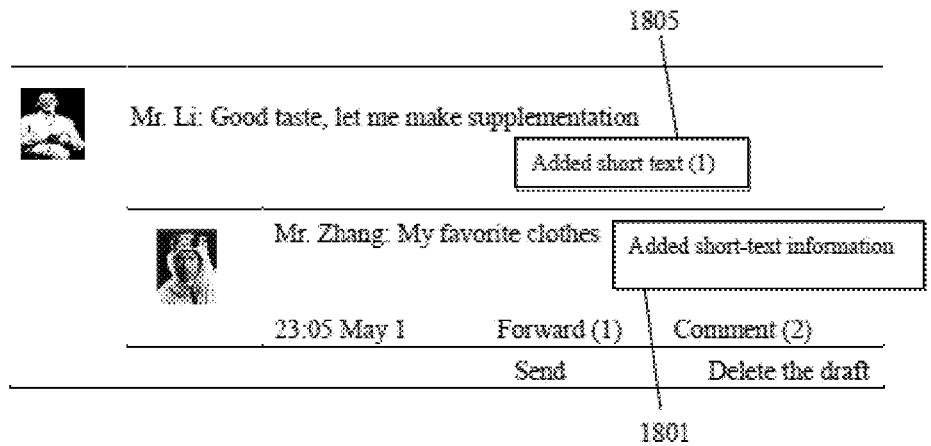
FIG. 18 is a schematic diagram of a piece of forwarded short-text information according to an embodiment of the present invention; an aggregated short-text information set added into the forwarded aggregation short-text information is as represented by 1801; and 1805 represents the aggregated short-text information set added into the forwarded comment information.

In this system, the user may add comment information while forwarding information. A piece of short-text information with comment information added while being forwarded is schematically illustrated in FIG. 4. In addition, this system allows the user to add an aggregated short-text information set in the comment information during forwarding. In the user interface for an forward operation as illustrated in FIG. 3, if the user clicks a virtual button "add an aggregated short-text information set" represented by 305, the user interface exhibits a virtual button corresponding to a to-be-edited aggregated short-text information set, as schematically illustrated in FIG. 16, wherein "added text (1)" represented by 1715 is a schematic diagram of such a virtual button, and the user may adjust the location of the virtual button in the text portion of the short text. If the user clicks the "store as a draft" represented by 1710 in FIG. 17, a forwarded draft of the short-text information whose the comment is added with the aggregated short-text information set is stored. FIG. 18 is a schematic diagram of a previously described draft, wherein 1801 represents the forwarded aggregated short-text information set draft added in the added comment information. With respect to the forwarded short-text information draft, the client provides a user interface for the user to edit the added aggregated short-text information set draft in the comment information. For example, in the user interfaces as illustrated in FIG. 17 and FIG. 18, if the user presses with fingers 1715 and 1801, the client exhibits the menu represented by 1601 schematically illustrated in FIG. 16 to the user. Still for example, the client exhibits the previous described short-text information draft in the user interface as illustrated in FIG. 14 for the user to make a selection.

When the user releases aggregation short-text information, the server correspondingly stores the released aggregation short-text information in the database, and records the recitation structure of the aggregation short-text information to the aggregated short-text information in the database. In the data sent by the server to the information receiver, with respect to one piece of short-text information, the data comprises a user ID of the user releasing the short-text information and an information ID thereof; with respect to each piece of aggregation short-text information, the data further comprises an aggregated short-text information set ID of each added aggregated short-text information set, and a display location of the aggregated short-text information set, such that the user conveniently perform related operations for editing, releasing and aggregating short-text information. When the user edit an aggregated short-text information set, if the user adds a piece of short-text information into the aggregated short-text information set as the aggregated short-text information, the client stores a draft of the aggregation short-text information set by means of recording the user ID of the aggregated short-text information and the information ID thereof. When the client sends the aggregation short-text information set draft to the server, in the data sent by the client for describing the composition of the aggregated short-text information set, the manner of recording the user ID of previously described aggregated short-text information and the information ID thereof. When the client initiates a request for the information, the server transfers the specific compositional data to the aggregated short-text information set to the client, wherein the data comprises the user ID of the releaser releasing the aggregated short-text information and the information ID thereof, and the corresponding value of the option "sequential locations of the aggregated short-text information in an aggregated short-text information set". As such, for example, when the user duplicates an aggregated short-text information set added in existing short-text information or perform an aggregate operation for the aggregated short-text information set by using the aggregated short-text information set added in the existing short-text information, the client may record the information by means of recording the user ID of the previously described aggregated short-text information and the information ID thereof when recording the composed aggregated short-text information set, and modifies the sequential location thereof in the set by means of modifying the value of the option "sequential locations of the aggregated short-text information in an aggregated short-text information set". The server stores an aggregation short-text information draft by using a data structure similar to the data structure for recording existing aggregation short-text information. The user ID of an editor of the draft is recorded in the database as a user ID of the releaser of the draft, and meanwhile an information ID assigned to the draft is also recorded in the database. The draft is recorded in the field of "information type" as a piece of draft information. The server stores an added aggregated short-text information set draft by using a data structure similar to the data structure for recording existing aggregation short-text information, and the database records the aggregation short-text information with other content being null except a piece of added short-text information set. The database records the user ID of an editor of the set draft as a user ID of the releaser of the aggregation short-text information, and meanwhile records an information ID assigned to the draft. The draft is recorded in the field "information type" as a piece of aggregated short-text information set draft. The client assign the information ID to the value of the information ID field when editing the aggregation short-text information draft and the aggregated short-text information set draft, wherein the information ID for use in draft has a different format from that of the information ID of the released short-text information. With respect to a draft of newly composed aggregated short-text information contained in the aggregation short-text information set draft, the client also assigns an information ID for use in the draft. If the user issues an instruction to formally release an aggregation short-text information draft, the server re-assigns information IDs to the aggregation short-text information and the aggregated newly composed short-text information contained in the added aggregated short-text information sets, and completes releasing of the information.

A client in the system, under a specific capacity restriction, locally stores the aggregation short-text information draft, aggregated short-text information set draft and newly composed short-text information draft, and does not upload these drafts to the server before the user decides to formally release these drafts. Another client in the system, under a specific capacity restriction, locally stores the aggregation short-text information draft, aggregated short-text information set draft and newly composed short-text information draft, and uploads these drafts to the server according to an instruction from the user when the user decides to formally release these drafts. Still another client in the system uploads all these drafts to the server for storage, but, under a specific capacity restriction, only locally temporarily caches the aggregation short-text information draft, aggregated short-text information set draft and newly composed short-text information draft. Once the client is restarted, the cached drafts are cleared.

With respect to some clients, for example, browser clients on a PC and a mobile phone, the data transferred by the system server to the clients contains program data causing the clients to provide the above interfaces and operations, for example, a file compiled by using the HTML language, and still for example, a program compiled by using JavaScript that is embedded into the above file. With respect to some other clients, the system server only needs to transfer suitable information data to the clients, and all the programs needed for performing related operations have been stored in the clients before the clients are connected to the system server.

Embodiment 2

Figure 19:
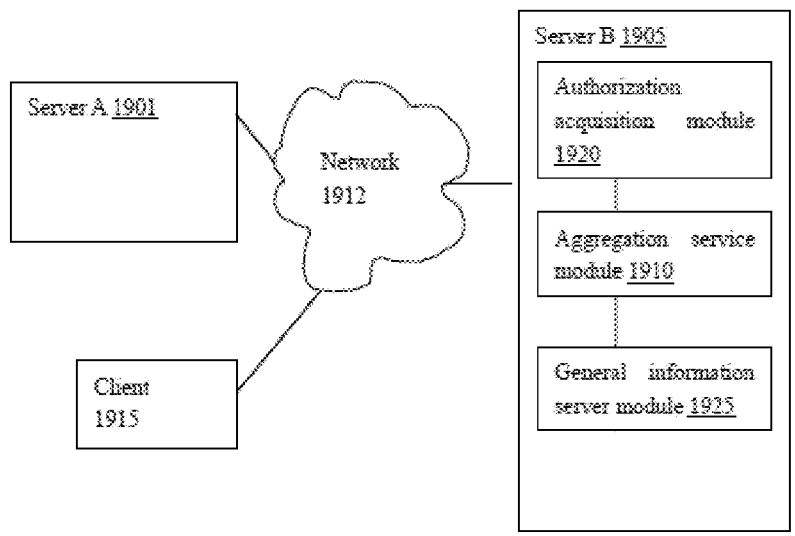
FIG. 19 is a schematic diagram of deployment of a server (1905) in a network according to an embodiment of the present invention.

A server is disclosed, and a schematic diagram of the server in one embodiment in a network deployment is as illustrated in FIG. 19, wherein a server B (1905) is a server, a server A (1901) comprises a server of a social network system supporting a user to release aggregation short-text information as described in Embodiment 1, and a client 1915 is a client of the server B.

The server B (1905) comprises the following modules:

a general information service module (1925), configured to receive data sent from the client 1915, and transmit data to the client 1915, to provide a network service for the client 1915, for example, provide electronic commerce services similar to Alibaba, for another example, provide search services similar to Google. In this embodiment, such services are briefly called basic services; the server B is capable of sending data to the terminal A, and receiving data from the terminal A;

an aggregation service module (1910), configured to acquire information from the server B according to an instruction of the user, edit short-text information according to the information, aggregate the short-text information into an aggregated information set, send an aggregation short-text information draft and an aggregated short-text information set draft to the server A, and uses the edited aggregation short-text information draft as formal aggregation short-text information and release the formal aggregation short-text information to the server A;

an authorization acquisition module (1920), configured to enable the server B to acquire authentication of releasing the aggregation short-text information at the server A.

Figure 20:
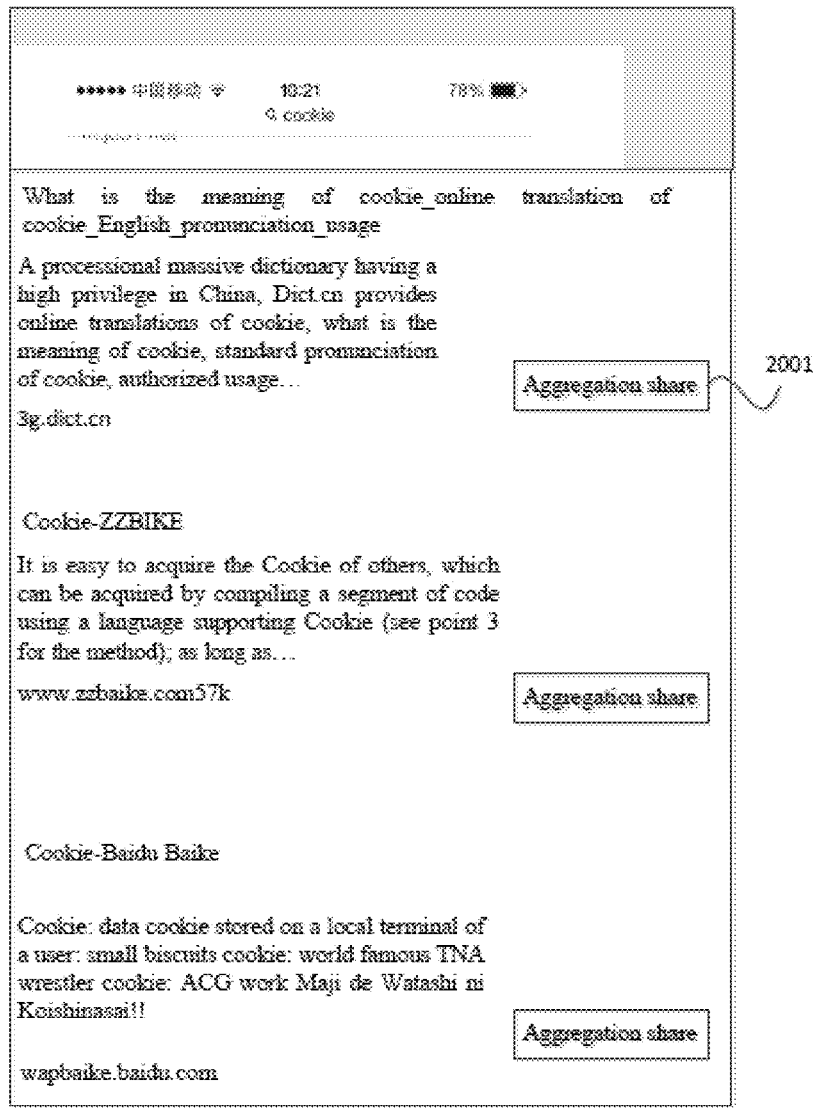
FIG. 20 is a schematic diagram of a display interface providing an aggregation information sharing button for a user according to an embodiment of the present invention.
Figure 21:
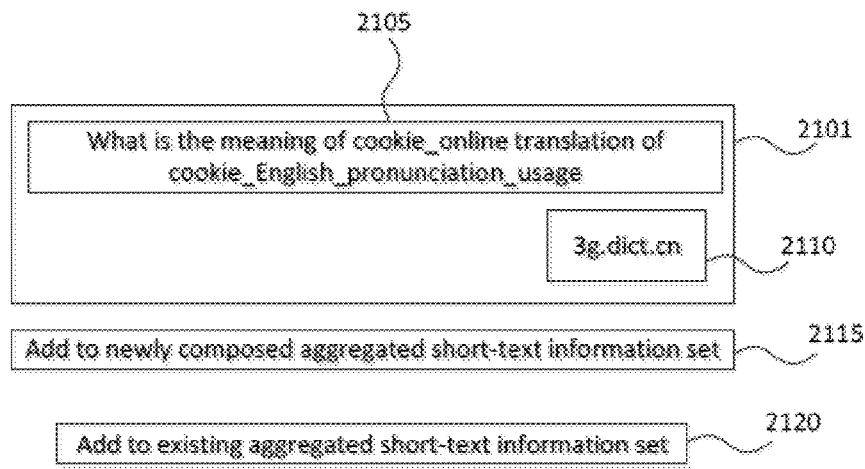
FIG. 21 is a schematic diagram of a user interface provided for a user to compose new short-text information and adding the new short-text information into an aggregated short-text information set according to an embodiment of the present invention.
Figure 22:
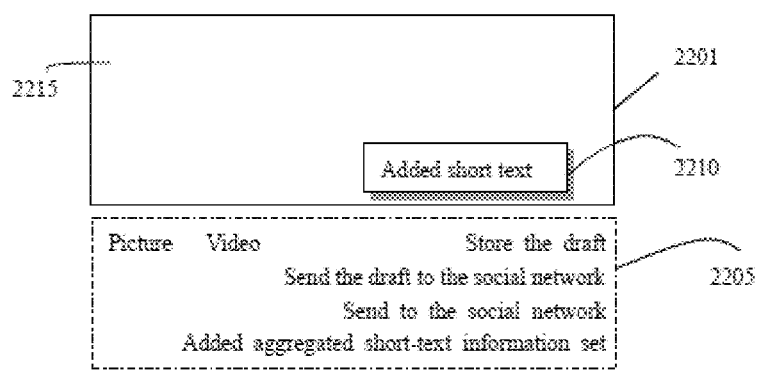
FIG. 22 is a schematic diagram of a user interface provided for a user to compose new aggregation short-text information and release or store the new aggregation short-text information according to an embodiment of the present invention; 2201 represents a text input box for the user to input texts, and 2215 represents a location where the user starts inputting the texts; 2210 represents an aggregated short-text information set which is added by the user into a text region of the aggregation short-text information; and a dotted line block 2205 represents an option bar constituted by a text virtual button.

The server B performs data communication with the client 1915, and sends data information in a predetermined format, for example, a file written in a hypertext markup language, such that when the client is capable of providing basic service to the user, the client can provide a corresponding user interface. The user interface is used to edit and release the aggregation short-text information by the user via the server B, and a schematic diagram of the user interface is as illustrated in FIG. 20. FIG. 20 is a display interface, provided by a search engine in a client, of a search result fed back by the user with respect to using a keyword Cookie by the user. In the user interface as illustrated in FIG. 20, if the user clicks a virtual button "aggregation share" (for example, as illustrated in 2001), the client will exhibit the user interface with the schematic diagram as illustrated in FIG. 21, wherein 2101 is a schematic diagram of an edit box, and the edit box is used to edit a text portion of corresponding short-text information by the user; 2105 is a text which has been well edited for the user when the interface is exhibited, and the user may modify, or rewrite after deletion; 2110 is a network link which has been well edited for the user, and the network link will be comprised in final released short-text information; the user clicks the virtual button 2115 "add a newly edited aggregated short-text information set", the client performs the data communication with the server B, and aggregation service module (1910) of the server B creates a piece of aggregated short-text information draft for the user, creates a piece of short-text information draft, adds the short-text information draft into the aggregated short-text information set draft, and content of the newly created short-text information is as illustrated in 2101. if the user clicks 2120 "bring into the aggregated short-text information set", the client will exhibit the interface with the schematic diagram as illustrated in FIG. 14. When the user is in the user interface as illustrated in FIG. 14, for example, after a click of a finger indicates the corresponding aggregated short-text information set draft, the client will exhibit an edit menu to the user, and options "add to a first piece of information location into an aggregated short-text information set", "add to the last piece of information location into an aggregated short-text information set", "add to a designated location into an aggregated short-text information set", "use an aggregated short-text information set to construct aggregation short-text information", and "send a draft to the social network" are defined in the menu; and the client completes a corresponding operation according to the user's selection.

A data construction of a schematic diagram similar to FIG. 8 is created in an aggregation service module database, and an aggregation service module uses the data construction to store a short-text information draft, an aggregation short-text information draft, and an aggregated short-text information draft edited by the user.

The user stores the aggregation short-text information draft, stores the aggregated short-text information draft, and stores the short-text information draft. The aggregation service module makes a corresponding storage in the database, and records reference structures of the aggregation short-text information to all aggregated short-text information in the database.

Embodiment 3

Figure 23:
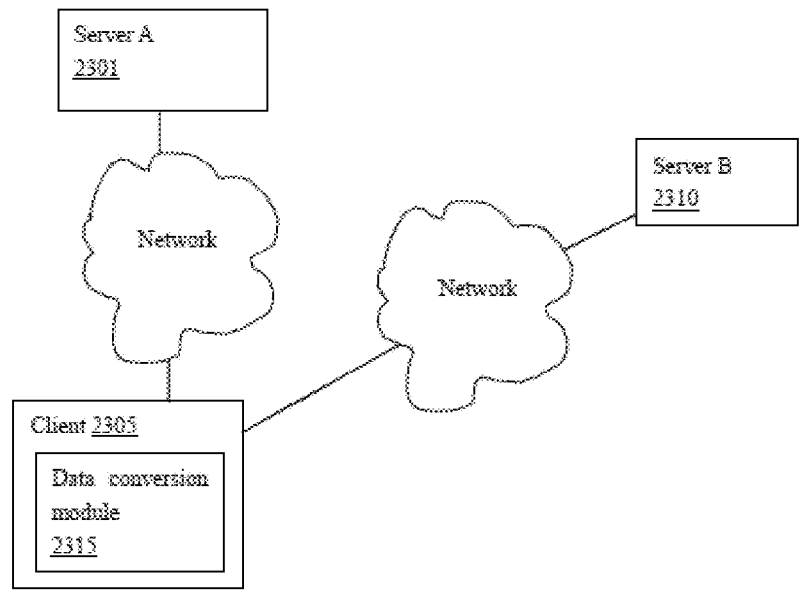
FIG. 23 is a schematic diagram of deployment of a client (2305) in a network according to an embodiment of the present invention.

A client that may be used in a client of a social network system in a specific Embodiment 1 is disclosed. One embodiment of the client, for example, is as illustrated in 2305 in FIG. 23. A schematic diagram of deployment a usage mode of the client in a network is as illustrated in FIG. 23. A server A as illustrated in 2301 is a server in a specific Embodiment 1, the client 2305 is connected to, via the network, a social network system constituted with the server A in a specific Embodiment 1, and the social network system in this embodiment is called a system A for short; and A server B as illustrated in 2310 is a server in a specific Embodiment 1, the client 2305 is connected to, via the network, a social network system constituted with the server B in a specific Embodiment 1, and the social network system in this embodiment is called a system B for short.

The client can support a user to add short-text information released in the system B into aggregation short-text information released in the system A released, and supports the user to add short-text information released in the system B into aggregation short-text information released in the system A. In addition, when the aggregation short-text information is edited and released by using the client, during editing an aggregation short-text information draft and an aggregated short-text information draft, the user does not need to consider whether the currently browsed short-text information is released in the system A or released in the system B; instead, the client needs to be instructed as to which system the information is to be released or uploaded only when the edited aggregation short-text information draft and aggregated short-text information set draft are uploaded to the server.

When the user needs to release the aggregation short-text information, the client will provide a user interface to enable the user to indicate whether corresponding aggregation short-text information is released to the system A or the system B. For example, in the user interface as illustrated in FIG. 12, when the user clicks the virtual button "send", the client would exhibits the corresponding user interface, for example, exhibiting menus with options being respectively "send to system A" and "send to system B". After the user makes a selection, the client sends the aggregation short-text information to a system designated by the user.

The client establishes a data storage structure similar to that illustrated in FIG. 8 with respect to the edited short-text information draft, aggregation short-text information draft and aggregated short-text information set draft, and distinguishes by using a newly added field "information source" in the short-text information table whether the information is existing short-text information in the system A or existing information in the system B or a piece of short-text information newly composed by the user. The short-text information described herein comprises aggregation short-text information and non-aggregation short-text information.

Figure 24:
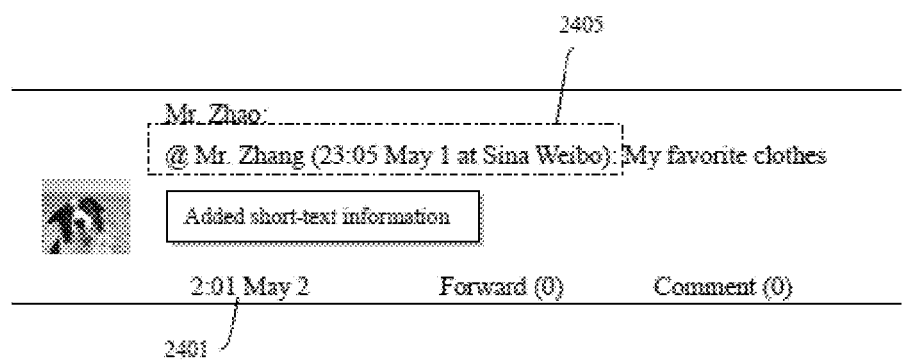
FIG. 24 is a schematic diagram of a folding state of aggregation short-text information which is sent from a social network system to another social network system according to an embodiment of the present invention.

A data conversion module (2315) is configured in the client, which is configured to convert, data which is received by the client from the system A and the system B for describing the aggregation short-text information data and non-aggregation short-text information sent to the client, into data in a local storage format. For example, the system A sends data of a piece of aggregation short-text information short-text information, the data describes the format of the information is a piece of short-text information wherein an aggregated short-text information set is added to a specific location in the text portion of the information, and the aggregated short-text information set comprises three pieces of aggregated short-text information. Assume that the user duplicates the aggregated short-text information set in the aggregation short-text information, and adds a piece of newly composed aggregated short-text information thereto and adds this duplicated modified aggregated short-text information set into an aggregation short-text information draft newly composed by the user, then when the client records this aggregation short-text information draft in the database, since the aggregation short-text information draft pertains to the newly composed short-text information draft, the user ID of the releaser and the information ID thereof are assigned by the client based on specific rules. With respect to the added aggregated short-text information set, since the set is the newly composed aggregated short-text information set by the user upon duplication, the client assigns an aggregated short-text information set ID thereto. With respect to the aggregated short-text information, the user ID and information ID of the information which pertains to the existing short-text information from the system A are still recorded in the database of the client in accordance the assigned values of the corresponding short-text information in the system A. With respect to short-text information newly composed by the user on the client, the client records various content proactively input by the user in a local database, for example, texts input by the user, pictures and videos added by the user, and in addition a pointer facilitating search of the pictures is recorded in the database. When the user selects to release the aggregation short-text information, according to the user's requirements, the client uses the data conversion unit to convert the content of the aggregation short-text information draft into data in the forms suitable for release in the system A or the system B: (1) if the user selects to release the aggregation information to the system A, since the existing short-text information involved in the aggregation short-text information is the existing short-text information in the system A, in the corresponding data conversion: the data conversion module convert the user ID and the information ID of the aggregation short-text information into values desired by the system A, for example, using a user ID assigned in the system A as the user ID, and maintaining a value assigned by the client as the information ID, modifies the user ID of the newly composed aggregated short-text information in the aggregated short-text information set into the user ID assigned in the system A, and then releases the aggregation short-text information to the server of the system A; and with respect to the pictures and the like which the system A request to upload, the client uploads the pictures correspondingly; (2) if the user selects to release the aggregation short-text information to the system B, the data conversion module, in addition to modifying the above user ID into the user ID of the user in the system B, perform the following processing for the existing short-text information in the system A in the added aggregated short-text information set: modifying the releaser into the releaser of the aggregated short-text information, and writing the identifier, for example, a nickname of the original releaser of the short-text information into a text portion of the existing short-text information, and noting when to release the information in the system A, indicating that the information is practically released by the user in the system A at a specific time point; a schematic diagram of the processed display object is as illustrated by the content represented by a dotted line block 2405, for example; if the aggregation short-text information is released by the user "Mr. Zhao", a piece of existing short-text information in the system A as illustrated in FIG. 1 would be modified by the data conversion module into the newly composed short-text information in the system B as illustrated in FIG. 24, wherein the release time indicated by 2401 is the release time of the newly composed short-text information in the system B, and before releasing the aggregation short-text information, with respect to the existing short-text information in the system B, the client would perform the following processing according to the requirements imposed by the system B on the data of the various content, including: with respect to the various related portions of the specific content which the system B requires to provide, if the client does not store these portions of the content, downloading these portions from the system A to the client, and then transferring the same to the server of the system B; and with respect to the point for ease of searching for the portion of content from the network which the system B requires to provide, if the client does not store the pointer, downloading the point from the system A to the client, and then transferring the same to the server of the system B.

Embodiment 4

Figure 25:
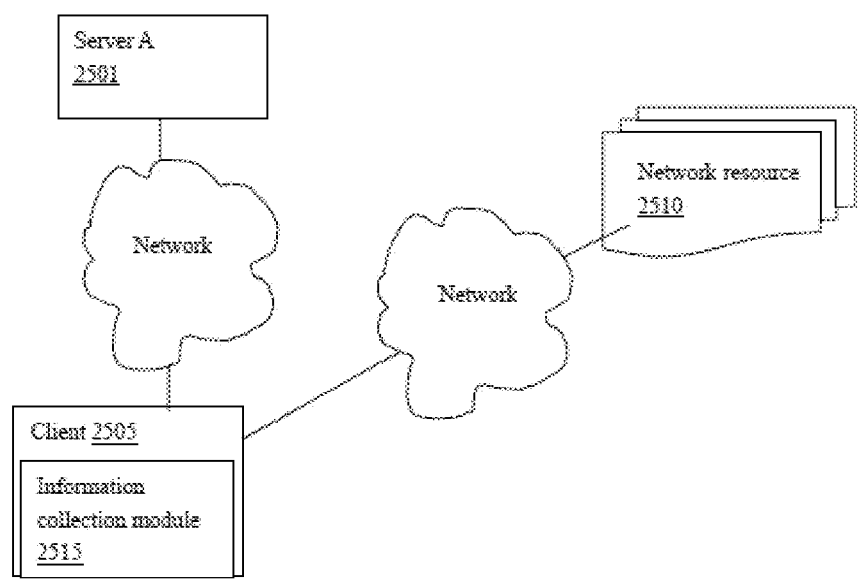
FIG. 25 is a schematic diagram of deployment of a client (2515) in a network according to an embodiment of the present invention.

A client is disclosed, and one embodiment of the client is as illustrated in 2505 in FIG. 25. A schematic diagram of deploying a usage mode in a network of the client is as illustrated in FIG. 25. A server A as illustrated in 2501 is a server as described in a specific Embodiment 1, the client 2505 is connected to, via the network, a social network system as described in a specific Embodiment 1 and constituted with the server A, and the social network system in this embodiment is called a system A for short; and 2310 illustrates an information resource in the network, for example, a Web information resource, for another example, a network resource accessed by the client 2505 acting as a specialized APP 2515 is an information collection module comprised in 2505, configured to collect information (as illustrated in 2510) in the network resource except for server A.

Figure 26:
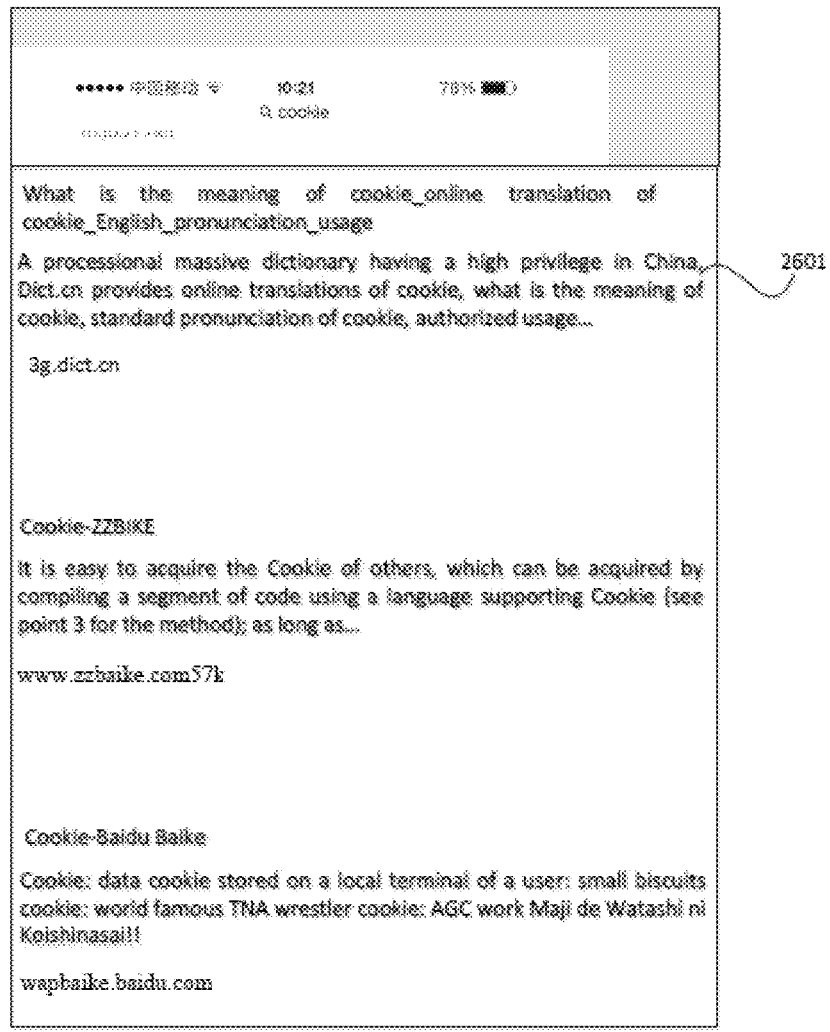
FIG. 26 is a schematic diagram of a user interface provided for a user to compose new short-text information and adding the new short-text information into an aggregated short-text information set according to an embodiment of the present invention.

The client may provide an interface for browsing a webpage resource for a user. For example, in one specific embodiment of this embodiment, when the user inputs a corresponding website in the client, the client can access the resource corresponding to the website. When the user uses the client to access a network resource, the client provides a corresponding user interface. As such, the user uses the interface to collect information, and write short-text information and bring the short-text information into an edited aggregated short-text information set. For example, FIG. 26 is a schematic diagram of a preceding mentioned network resource that is exhibited by the client to the user. The client is a browser running in a mobile phone, which is a search result of a search engine with respect to a keyword Cookie. The user presses a display area referred by 2601 and searching for a feedback result in a display interface, and the client exhibits an interface with a schematic diagram as illustrated in FIG. 21, wherein 2101 is a text-editing box in the interface, and 2105 is an abstract relevant to a network resource edited by the client for the user according to a display feature of the network resource, which allows modification of the user. 2110 represents a URI corresponding to the network resource grabbed by the client for the user, and the user clicks a virtual button 2115 "add a new composed aggregated short-text information set". The client newly creates an aggregated short-text information set draft, creates a piece of short-text information draft, brings the short-text information draft into the aggregated short-text information set draft, and content of the newly created short-text information is as illustrated in 2101. If the user clicks 2120 "add an aggregated short-text information set", the client will exhibit the interface with the schematic diagram as illustrated in FIG. 14. When the user is in the user interface as illustrated in FIG. 14, for example, after a click of a finger indicates the corresponding aggregated short-text information set draft, the client will exhibit an edit menu to the user, and options "add to a first piece of information location into an aggregated short-text information set", "add to the last piece of information location into an aggregated short-text information set", "add to a designated location into an aggregated short-text information set", "use an aggregated short-text information set to construct aggregated short-text information"; and "send a draft to the social network" are defined in the menu; and the client completes a subsequent operation according to the selection of the user, for example, if the user selects "add to a first piece of information location into an aggregated short-text information set", the client requests the user to make a confirmation, and after the user makes a confirmation, the short-text informationshort-text information in the set is a location of a first piece of the aggregated short-text information, and the content of the newly created short-text information is as illustrated in 2101.

Embodiment 5

Figure 27:
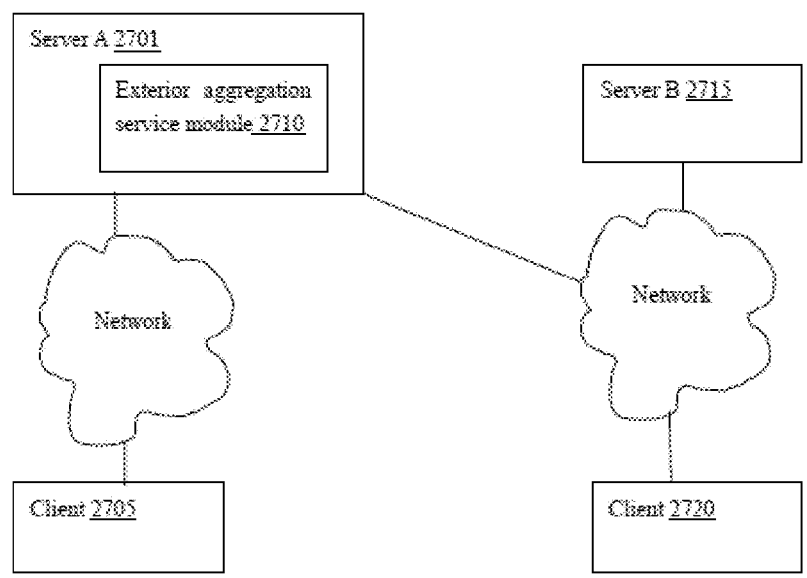
FIG. 27 is a schematic diagram of deployment of a server (2701) in a network according to an embodiment of the present invention.
Figure 28:
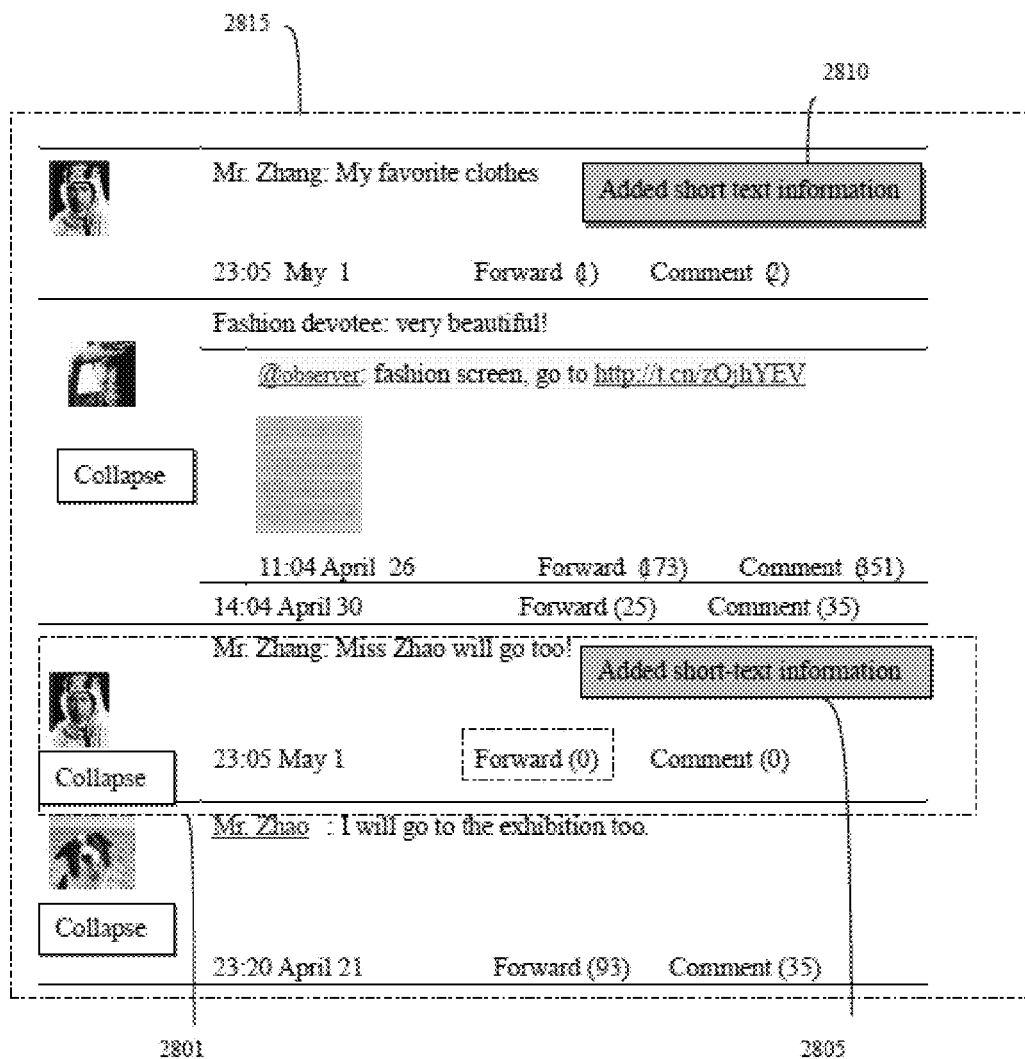
FIG. 28 is a schematic diagram of a scenario where aggregation short-text information is changed to aggregated short-text information according to an embodiment of the present invention; a dotted line block 2815 represents aggregation short-text information released by Mr. Zhang, wherein an aggregated short-text information set 2810 is added thereto, and the color of 2810 is changed to represent that the set has been foldedly exhibited; the aggregated short-text information set 2810 comprises three pieces of aggregated short-text information, wherein the short-text information represented by 2801 is a piece of aggregation short-text information where the aggregated short-text information set represented by 2805 is added, and 2805 is in a light color which represents that the set is not foldedly exhibited.

A server is disclosed, and a schematic diagram of one embodiment of the server in a network deployment is as illustrated in 2701 in FIG. 27. The server has all functions of a server as described in a specific Embodiment 1, and is capable of constructing a network system as described in a specific Embodiment 1 after being connected to the client 2705 via a network. A client 2720 constructs a social network system with a server B as illustrated in 2715 via network connection. In this embodiment, the social network system is called a system B for short, and the system B allows a user to release short-text information. The server as illustrated in 2701 comprises an "exterior aggregation service module" as illustrated in 2701, and the service module comprises, with respect to an aggregated short-text information set stored in a database of the server, an aggregated information set draft, gives one URL, stores a corresponding relationship between the URL and a corresponding aggregated short-text information set in database of the server, and provides a user interface for the user to acquire the URL and duplicate the URL, for example, when a finger of the user presses a virtual button corresponding to the aggregated short-text information set, an option "display and duplicate the URL of an aggregated short-text information set" is added in a selection menu provided by the client, and the client exhibits the URL well edited for the user, and duplicates the URL into a clipboard. The URL is inserted into the short-text information released in a system B. When the short-text information released in a system B is browsed, and if a user clicks the URL, the client 2720 used by the user supports access of a network resource corresponding to the URL at the server A according to the URL. In addition, the user using the client 2720 to initiate the access has permissions of accessing the aggregated short-text information set at the server A, for example, the aggregated short-text information set is originally defined as opening to the public by a publisher user, afterwards, the exterior aggregation service module in the server A sends a necessary data so as to exhibit the aggregated short-text information set, and at least with respect to the client 2720 using a standard browser to access the data, a preset format data transmitted by the exterior aggregation service module (2710) can enable the aggregated short-text information set to be exhibited in the following manner: if the aggregated short-text information comprised in the aggregated short-text information set is also the aggregation short-text information, the aggregated short-text information will be defaultly exhibited in a folding state, and a corresponding user interface is provided for the user to release an instruction; after the user indicates the client to unfoldedly exhibit the aggregated short-text information, the client further unfoldedly exhibits the aggregated short-text information, and unfoldedly exhibits an the aggregated short-text information set which is additional, and is required to be exhibited by the user.

In addition, the exterior aggregation service module initiates identification to the access to the URL comprised in a network system which the user browses the information. If the network system can be identified, for example, the system B, the exterior aggregation service module supports an exhibition format equivalent to or similar to the short-text information in the network system to exhibit the short-text information. With respect to the access to the URL original from the network system, the exterior aggregation service module will comply with the manner of exhibition format for the short-text information in the network system to prepare a preset format file that is prepared by the server A to the client 2720, such that the client 2720 is also in an allowable range, and complies with the exhibition format for the short-text information equivalent to or similar to the system B to unfoldedly exhibit an aggregation short-text information set corresponding to the URL for the user, which satisfies the above exhibition rules for the aggregation short-text information, and in the meantime, enables a format, a font, and a layout of all short-text information to exhibit in the manner equivalent to or similar to the system B.

Embodiment 6

Figure 29:
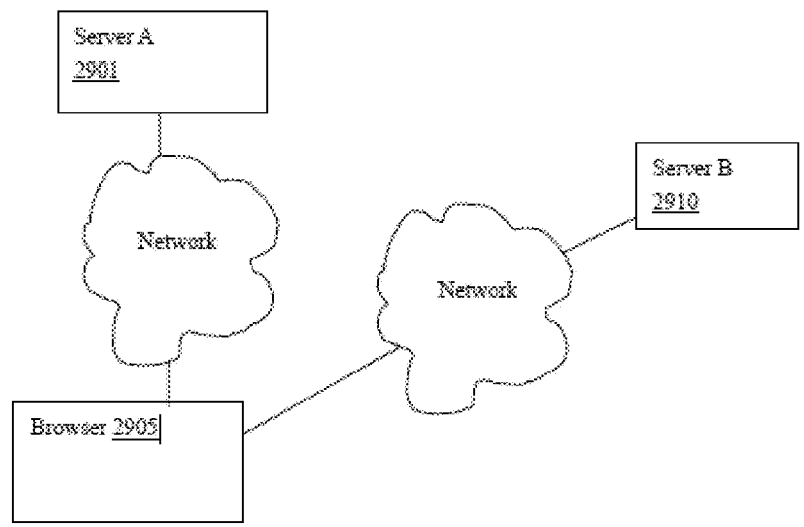
FIG. 29 is a schematic diagram of deployment of a server according to an embodiment of the present invention, wherein the server is capable of providing information services for a webpage browser, and is capable of transferring necessary data information to the webpage browser such that the webpage browser is capable of composing aggregation short-text information by following an instruction from a user according to information provided by the information services, and such that the webpage browser becomes a client of a social network system which is capable of releasing aggregation short-text information.

A server (2910) is disclosed, and FIG. 29 illustrates a schematic diagram of deploying a usage mode in a network of the server (2910). A server end A as illustrated in 2901 is a server end of a social network as described in a specific Embodiment 1, and 2905 is a webpage browser client end; the server 2910 is capable of providing a basic service as described in a specific Embodiment 2; and the server comprises:

a sender, configured to send data to the webpage browser client end (2905) according to a user request;

a processor, configured to encapsulate information of basic services and a necessary program data in a file in a predetermined format;

sending data to a browser according to the request from the user by the server specifically comprises: sending the file in the predetermined format by the sender to the browser;

wherein the file in the predetermined format further comprises option information; wherein the option information is displayed as an option interface element, and when the option interface element is selected by the user, at least one operation option is provided for the user, such that the user writes information relevant to the basic service information to short-text information according to the corresponding option, uses the short-text information as aggregated short-text information to bring the aggregated short-text information into aggregated short-text information, and defines a location attribute of the aggregated short-text information. As such, the browser 2905 releases the aggregated short-text information to the server 2901.

Generally, the server sends a file in a predetermined format to a browser, and the file is run via the browser, which enables the browser during the running to have the following modules:

a short-text information writing module, configured to write short-text information; and the short-text information writing module preferably comprises a short-text information pre-writing sub-module, configured to write a short-text information draft to a user based on information relevant to basic service information according to an instruction of the user;

an aggregation short-text information writing module, configured to write aggregation short-text information;

a aggregation short-text information releasing module, configured to release the aggregation short-text information to a designated social network.

For example, in one embodiment of the specific embodiments, the server 2910 performs data communication with the webpage browser 2905, and sends data information in a predetermined format, for example, a file written in a hypertext markup language comprises a program written in JavaScript, such that after the webpage browser runs according to the file:

(1) when providing the basic service in Embodiment 2 to the user, the browser provides a corresponding user interface; the user interface is used to edit and release the aggregation short-text information by the user via the browser 2905, and a schematic diagram of the user interface is as illustrated in FIG. 20; FIG. 20 is a display interface, provided by a search engine in a webpage browser, of a search result fed back by the user with respect to using a keyword Cookie by the user; on the user interface as illustrated in FIG. 20, if the user clicks a virtual button "aggregation share" (for example, as illustrated in FIG. 20), the browser will show the user interface with the schematic diagram as illustrated in FIG. 21, wherein 2101 is a schematic diagram of an edit box, and the edit box is used to edit a text portion of corresponding short-text information by the user; 2105 is a text which has been well edited for the user when the interface is exhibited, and the user may modified, or rewrite after deletion; 2110 is a network link which has been well edited for the user, and the network link will be comprised in final released short-text information; the user clicks the virtual button 2115 "add a newly composed aggregation short-text information set", and the client newly creates an aggregated short-text information gathering draft, creates a short-text information draft, brings the short-text information draft into the aggregated short-text information gathering draft, and content of the newly created short-text information is as illustrated in 2101; if the user clicks 2120 "add an aggregated short-text information set", the client will exhibit the interface with the schematic diagram as illustrated in FIG. 14; when the user is in the user interface as illustrated in FIG. 14, for example, after a finger click indicates the corresponding aggregated short-text information set draft, the client will exhibits an edit menu to the user, and options "add to a first piece of information location into an aggregated short-text information set", "add to the last piece of information location into an aggregated short-text information set", "add to a designated location into an aggregated short-text information set", and "use the aggregated short-text information set to construct the aggregated short-text information"; and the client completes a subsequent operation according to the selection of the user, for example, if the user selects "add to a first piece of information location into an aggregated short-text information set", the client request the client to make a confirmation, and after the user makes a confirmation, the short-text information short-text information in the set is a location of a first piece of the aggregated short-text information, and the content of the newly created short-text information is as illustrated in 2101.

(2) the browser provides the option of releasing the aggregation short-text information to the server A (2901) for the user, for example, when the user presses the aggregation short-text information draft 1401 in FIG. 14, the browser provides the option "release aggregation short-text information to a designated social network" for releasing the aggregation short-text information to the server A (2901) for the user, and the browser sends the aggregation short-text information to the server A (2901) according to an instruction from the user.

What is claimed is:

1. An information transferring method, comprising:

sending, by a client, a data request to a server to request information associated with a user account of the client;

receiving, by the client, N pieces of information sent by the server according to the data request and corresponding N pieces of information identifier; wherein the N pieces of information identifier are used for respectively uniquely identifying the N pieces of information in a system formed by the client and the server, and N is an integer greater than or equal to 2;

exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information, wherein at least two pieces of information in the multiple pieces of information contained in the $i^{th}$ piece of information are provided with corresponding at least two pieces of information identifier; wherein the at least two pieces of information identifier are used for respectively uniquely identify the at least two pieces of information in the multiple pieces of information contained in the $i^{th}$ piece of information in a system formed by the client and the server, and the first indication information is used for indicating a relative position relationship of the multiple pieces of information contained in the $i^{th}$ piece of information during exhibition;

exhibiting, by the client, the $i^{th}$ piece of information when the $i^{th}$ piece of information is non-combined information; wherein i is an integer greater than or equal to 1 and smaller than or equal to N;

receiving, by the client, at least two pieces of information input by a user, and determining, by the client, second indication information corresponding to the at least two pieces of information according to the user's input; or determining, by the client, at least two information identifiers corresponding to at least two pieces of information in the N pieces of information, and second indication information corresponding to the at least two pieces of information in the N pieces of information according to a predetermined operation of a user for the at least two pieces of information in the N pieces of information, wherein the at least two pieces of information in the N pieces of information comprise at least one piece of combined information, and the at least two information identifiers comprise at least one piece of information identifier corresponding to the one piece of combined information, or the at least two pieces of information in the N pieces of information do not comprise combined information, and at least one of the at least two pieces of information is one of the multiple pieces of information contained in combined information, and the at least two information identifiers comprise at least one information identifier corresponding to the one of the multiple pieces of information contained in combined information; wherein the second indication information is used for indicating a relative position relationship of the at least two pieces of information input by the user during exhibition; or indicating a relative position relationship of the at least two pieces of information in the N pieces of information during exhibition, wherein the relative position relationship corresponding to the second indication information is determined according to the user's input or the predetermined operation; and sending, by the client, the at least two pieces of information input by the user and the second indication information corresponding to the at least two pieces of information to the server, or sending the at least two information identifiers of the at least two pieces of information in the N pieces of information and the second indication information corresponding to the at least two pieces of information in the N pieces of information to the server.

2. The method according to claim 1, wherein the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

before or in response to determining whether the $i^{th}$ piece of information is the combined information, acquiring, by the client, the first indication information corresponding to the $i^{th}$ piece of information and exhibiting the multiple pieces of information contained in the $i^{th}$ piece of information according to the first indication information corresponding to the $i^{th}$ piece of information.

3. The method according to claim 1, wherein the $i^{th}$ piece of information received by the client is contained in a file in a predetermined format sent by the server to the client; wherein the file in the predetermined format specifies a provision of an exhibition manner of the $i^{th}$ piece of information; and the exhibiting, by the client, multiple pieces of information contained in an $i^{th}$ piece of information according to first indication information corresponding to the $i^{th}$ piece of information when the $i^{th}$ piece of information in the N pieces of information is combined information containing the multiple pieces of information specifically comprises:

exhibiting the multiple pieces of information contained in the $i^{th}$ piece of information according to the provision of the exhibition manner of the multiple pieces of information contained in the $i^{th}$ piece of information specified in the file in the predetermined format; wherein the provision of the exhibition manner of the multiple pieces of information contained in the $i^{th}$ piece of information specified in the file in the predetermined format is defined by the server according to the first indication information corresponding to the $i^{th}$ piece of information.

4. The method according to claim 1, wherein the predetermined operation comprises one or any combination of the following operations:

an operation for selecting at least two pieces of information in the N pieces of information; and an operation for sequencing at least two pieces of information in the N pieces of information.

5. The method according to claim 4, wherein prior to the exhibiting multiple pieces of information contained in an $i^{th}$ piece of information according to first indication information corresponding to the $i^{th}$ piece of information when the $i^{th}$ piece of information in the N pieces of information is combined information containing the multiple pieces of information, the method further comprises:

exhibiting, by the client, at least one piece of information in the multiple pieces of information contained in the $i^{th}$ piece of information, and hiding at least one piece of information in the multiple pieces of information contained in the $i^{th}$ piece of information; and the exhibiting, by the client, multiple pieces of information contained in an $i^{th}$ piece of information according to first indication information corresponding to the $i^{th}$ piece of information specifically comprises:

receiving an exhibition instruction from the user, and exhibiting the multiple pieces of information in the $i^{th}$ piece of information according to the exhibition instruction and the relative position relationship indicated by the first indication information; wherein the exhibition instruction is used for instructing the client to exhibit the multiple pieces of information contained in the $i^{th}$ piece of information.

6. A client, comprising:

a sender, configured to send a data request to a server to request information associated with a user account of the client;

a receiver, configured to receive N pieces of information sent by the server according to the data request and corresponding N pieces of information identifier; wherein the N pieces of information identifier are used for respectively uniquely identify the N pieces of information in a system formed by the client and the server, and N is an integer greater than or equal to 2; and an output device, configured to exhibit multiple pieces of information contained in an $i^{th}$ piece of information according to first indication information corresponding to the $i^{th}$ piece of information when the $i^{th}$ piece of information in the N pieces of information is combined information containing the multiple pieces of information, wherein at least two pieces of information in the multiple pieces of information contained in the $i^{th}$ piece of information are provided with corresponding at least two pieces of information identifier; wherein the at least two pieces of information identifier are used for respectively uniquely identify the at least two pieces of information in the multiple pieces of information contained in the $i^{th}$ piece of information in a system formed by the client and the server, and the first indication information is used for indicating a relative position relationship of the multiple pieces of information contained in the $i^{th}$ piece of information during exhibition;

wherein the output device is further configured to exhibit the $i^{th}$ piece of information when the $i^{th}$ piece of information is non-combined information;

wherein i is an integer greater than or equal to 1 and less than or equal to N;

the client further comprising:

an input device, configured to receive at least two pieces of information input by a user; or receive a predetermined operation of a user for the at least two pieces of information in the N pieces of information, wherein the at least two pieces of information in the N pieces of information comprise at least one piece of combined information, or the at least two pieces of information in the N pieces of information do not comprise combined information, and at least one of the at least two pieces of information is one of the multiple pieces of information contained in combined information;

a processor, configured to determine second indication information corresponding to the at least two pieces of information input by a user according to the user's input, or determine at least two information identifiers corresponding to the at least two pieces of information in the N pieces of information, and second indication information corresponding to the at least two pieces of information in the N pieces of information according to the predetermined operation; wherein the at least two information identifiers comprise at least one piece of information identifier corresponding to the one piece of combined information when the at least two pieces of information in the N pieces of information comprise at least one piece of combined information, or the at least two information identifiers comprise at least one information identifier corresponding to the one of the multiple pieces of information contained in combined information when the at least two pieces of information in the N pieces of information do not comprise combined information, and at least one of the at least two pieces of information is one of the multiple pieces of information contained in combined information, and the second indication information is used for indicating a relative position relationship of the at least two pieces of information input by a user during exhibition, or indicating a relative position relationship of the at least two pieces of information in the N pieces of information during exhibition, wherein the relative position relationship corresponding to the second indication information is determined according to the user's input or the predetermined operation; and wherein the sender is further configured to send the at least two pieces of information input by the user and the second indication information corresponding to the at least two pieces of information input by the user to the server, or send the at least two information identifiers of the at least two pieces of information in the N pieces of information and the second indication information corresponding to the at least two pieces of information in the N pieces of information to the server.

7. The client according to claim 6, wherein the receiver is further configured to receive the first indication information from the server; and the output device is specifically configured to exhibit the multiple pieces of information contained in the $i^{th}$ piece of information according to the first indication information.

8. The client according to claim 6, wherein the $i^{th}$ piece of information received by the client is contained in a file in a predetermined format sent by the server to the client; wherein the file in the predetermined format specifies a provision of an exhibition manner of the $i^{th}$ piece of information; and the output device is specifically configured to exhibit the multiple pieces of information contained in the $i^{th}$ piece of information according to the provision of the exhibition manner of the multiple pieces of information contained in the $i^{th}$ piece of information specified in the file in the predetermined format when the $i^{th}$ piece of information is combined information containing multiple pieces of information; wherein the provision of the exhibition manner of the multiple pieces of information contained in the $i^{th}$ piece of information specified in the file in the predetermined format is defined by the server according to the first indication information corresponding to the $i^{th}$ piece of information.

9. The client according to claim 6, wherein the predetermined operation comprises one or any combination of the following operations:

an operation for selecting at least two pieces of information in the N pieces of information; and an operation for sequencing at least two pieces of information in the N pieces of information.

10. The client according to claim 9, wherein the input device is further configured to receive an exhibition instruction input by the user; wherein the exhibition instruction is used for instructing the client to exhibit the multiple pieces of information contained in the $i^{th}$ piece of information; and the output device is specifically configured to: exhibit at least one piece of information in the multiple pieces of information contained in the $i^{th}$ piece of information, and hiding at least one piece of information in the multiple pieces of information contained in the $i^{th}$ piece of information when the $i^{th}$ piece of information in the N pieces of information is combined information containing the multiple pieces of information; exhibit the multiple pieces of information in the $i^{th}$ piece of information according to the exhibition instruction and the relative position relationship indicated by the first indication information when the exhibition instruction is received; and exhibit the $i^{th}$ piece of information when the $i^{th}$ piece of information is non-combined information.

11. A computer program product, comprising:

a non-transitory storage medium storing computer executable program instructions, which, when being executed by at least one processor in a client, cause the at least one processor to:

send a data request to a server to request information associated with a user account of the client;

receive N pieces of information sent by the server according to the data request and corresponding N pieces of information identifier; wherein the N pieces of information identifier are used for respectively uniquely identifying the N pieces of information in a system formed by the client and the server, and N is an integer greater than or equal to 2;

exhibit multiple pieces of information contained in an $i^{th}$ piece of information according to first indication information corresponding to the $i^{th}$ piece of information when the $i^{th}$ piece of information in the N pieces of information is combined information containing the multiple pieces of information, wherein at least two pieces of information in the multiple pieces of information contained in the $i^{th}$ piece of information are provided with corresponding at least two pieces of information identifier; wherein the at least two pieces of information identifier are used for respectively uniquely identify the at least two pieces of information in the multiple pieces of information contained in the $i^{th}$ piece of information in a system formed by the client and the server, and the first indication information is used for indicating a relative position relationship of the multiple pieces of information contained in the $i^{th}$ piece of information during exhibition;

exhibit the $i^{th}$ piece of information when the $i^{th}$ piece of information is non-combined information; wherein i is an integer greater than or equal to 1 and smaller than or equal to N;

receive at least two pieces of information input by a user and determine second indication information corresponding to the at least two pieces of information according to the user's input; or determine at least two information identifiers corresponding to at least two pieces of information in the N pieces of information, and second indication information corresponding to the at least two pieces of information in the N pieces of information according to a predetermined operation of a user for the at least two pieces of information in the N pieces of information, wherein the at least two pieces of information in the N pieces of information comprise at least one piece of combined information, and the at least two information identifiers comprise at least one piece of information identifier corresponding to the one piece of combined information, or the at least two pieces of information in the N pieces of information do not comprise combined information, and at least one of the at least two pieces of information is one of the multiple pieces of information contained in combined information, and the at least two information identifiers comprise at least one information identifier corresponding to the one of the multiple pieces of information contained in combined information; wherein the second indication information is used for indicating a relative position relationship of the at least two pieces of information input by the user during exhibition, or indicating a relative position relationship of the at least two pieces of information in the N pieces of information during exhibition; wherein the relative position relationship corresponding to the second indication information is determined according to the user's input or the predetermined operation; and send the at least two pieces of information input by the user and the second indication information corresponding to the at least two pieces of information input by the user to the server; or send the at least two information identifiers of the at least two pieces of information in the N pieces of information and the second indication information corresponding to the at least two pieces of information in the N pieces of information to the server.

12. The computer program product according to claim 11, wherein the program instructions, when being executed, cause the at least processor to:

receive a file in a predetermined format sent by the server to the client; wherein the file in the predetermined format specifies a provision of an exhibition manner of the $i^{th}$ piece of information; and exhibit the multiple pieces of information contained in the $i^{th}$ piece of information according to the provision of the exhibition manner of the multiple pieces of information contained in the $i$th piece of information specified in the file in the predetermined format when the $i^{th}$ piece of information in the N pieces of information is combined information containing the multiple pieces of information, wherein the provision of the exhibition manner of the multiple pieces of information contained in the $i^{th}$ piece of information specified in the file in the predetermined format is defined by the server according to the first indication information corresponding to the $i^{th}$ piece of information.

13. The computer program product according to claim 11, wherein the predetermined operation comprises one or any combination of the following operations:

an operation for selecting at least two pieces of information in the N pieces of information; and an operation for sequencing at least two pieces of information in the N pieces of information.

14. The computer program product according to claim 11, wherein the computer executable program instructions, when being executed, cause the at least processor to:

exhibit at least one piece of information in the multiple pieces of information contained in the $i^{th}$ piece of information, and hiding at least one piece of information in the multiple pieces of information contained in the $i^{th}$ piece of information when the $i^{th}$ piece of information in the N pieces of information is combined information containing the multiple pieces of information;

wherein the exhibiting multiple pieces of information contained in an $i^{th}$ piece of information according to first indication information corresponding to the $i^{th}$ piece of information specifically comprises:

receive an exhibition instruction from the user, and exhibiting the multiple pieces of information in the $i^{th}$ piece of information according to the exhibition instruction and the relative position relationship indicated by the first indication information; wherein the exhibition instruction is used for instructing the client to exhibit the multiple pieces of information contained in the $i^{th}$ piece of information.

* * * * *